(12) United States Patent
Lauer

(10) Patent No.: US 10,408,301 B2
(45) Date of Patent: Sep. 10, 2019

(54) MULTIFUNCTIONAL TOOL HAVING A DEVICE FOR ACTUATING A QUICK RELEASE CHAIN FASTENER

(71) Applicant: QCS Quality Consult Service GmbH, Brülisau (CH)

(72) Inventor: Swen Lauer, Garmisch-Partenkirchen (DE)

(73) Assignee: QCS Quality Consult Service GmbH (CH)

(*) Notice: Subject to any disclaimer, the term of this patent is extended or adjusted under 35 U.S.C. 154(b) by 0 days.

(21) Appl. No.: 15/920,921

(22) Filed: Mar. 14, 2018

(65) Prior Publication Data
US 2018/0202516 A1    Jul. 19, 2018

Related U.S. Application Data

(63) Continuation of application No. PCT/EP2016/071576, filed on Sep. 13, 2016, which
(Continued)

(51) Int. Cl.
*B25B 13/00* (2006.01)
*F16G 3/00* (2006.01)
(Continued)

(52) U.S. Cl.
CPC ............. *F16G 3/006* (2013.01); *B21J 15/42* (2013.01); *B25B 27/0071* (2013.01); *B25B 27/22* (2013.01)

(58) Field of Classification Search
CPC ..... F16G 3/006; B25B 27/22; B25B 27/0071; B21J 15/42
(Continued)

(56) References Cited

U.S. PATENT DOCUMENTS 1,994,270 A * 3/1935 Cetrano .................. B25B 27/22
254/246
2,361,971 A    11/1944 Shipman
(Continued)

FOREIGN PATENT DOCUMENTS

CN    102887335 A    1/2013
CN    203510085 U    4/2014
(Continued)

OTHER PUBLICATIONS

International Preliminary Report on Patentability dated May 1, 2018 issued in parallel PCT App. No. PCT/EP2016/071576 (9 pages).
(Continued)

*Primary Examiner* — David B Jones
(74) *Attorney, Agent, or Firm* — Haynes and Boone, LLP

(57) ABSTRACT

What is described is a portable multifunctional tool having a handle portion and a tool accommodating portion having a tool function element arranged thereon configured to actuate a quick release chain fastener having two chain link plates and two chain link plate connection members. The tool function element has a first force exertion unit configured to exert a force on the first chain link plate connection member of the quick release chain fastener, and a second force exertion unit configured to exert a force on the second chain link plate connection member of the quick release chain fastener. The first force exertion unit and the second force exertion unit are translationally movable in relation to each other so as to actuate the quick release chain fastener by means of said translational movement. Moreover, the tool function element has a linear guide having a stationary first linear guide element and a second linear guide element movably arranged within the former, only one of the two force exertion units being arranged on the second linear guide element.

24 Claims, 25 Drawing Sheets

Related U.S. Application Data is a continuation of application No. PCT/EP2015/071492, filed on Sep. 18, 2015.

(51) Int. Cl.
   *B21J 15/42* (2006.01)
   *B25B 27/22* (2006.01)
   *B25B 27/00* (2006.01)

(58) Field of Classification Search
   USPC .................................................. 59/7
   See application file for complete search history.

(56) References Cited

U.S. PATENT DOCUMENTS

| | | | |
|---|---|---|---|
| 3,379,005 | A | 4/1968 | Jones |
| 3,648,973 | A | 3/1972 | Farrell |
| 4,394,810 | A | 7/1983 | Womble |
| 4,429,525 | A | 2/1984 | Doak |
| 5,056,305 | A | 10/1991 | Cole |
| 5,140,736 | A | 8/1992 | Hsiao |
| 6,032,455 | A * | 3/2000 | Reimann .............. B21J 15/42 59/11 |
| 6,574,817 | B2 * | 6/2003 | Wu .................. B25B 27/0071 7/118 |
| 7,497,071 | B2 | 3/2009 | Tillberg |
| D595,106 | S * | 6/2009 | Rubin .......................... D8/105 |
| 2002/0173395 | A1 | 11/2002 | Reiter et al. |
| 2007/0197333 | A1 | 8/2007 | Santos |
| 2012/0255273 | A1 | 10/2012 | Wang |
| 2014/0182418 | A1 | 7/2014 | Chen |

FOREIGN PATENT DOCUMENTS

| | | |
|---|---|---|
| CN | 204546411 U | 8/2015 |
| DE | 102013100027 A1 | 7/2014 |
| EP | 1245862 A2 | 10/2002 |
| EP | 1816372 A2 | 8/2007 |
| JP | S63138056 | 9/1988 |
| JP | 3131475 U | 5/2007 |
| JP | 2010247313 A | 11/2010 |
| JP | 2016068215 A | 5/2016 |
| TW | M427993 U1 | 1/2012 |

OTHER PUBLICATIONS

Office Action dated Mar. 14, 2019 in the parallel Chinese patent application No. 201680054330.6 (15 pages with English translation).

Office Action dated Apr. 16, 2019 in the parallel Japanese patent application 2018-514428 (6 pages with English translation).

Office Action dated May 31, 2019 issued in the parallel Canadian patent application No. 2,998,764 (7 pages).

* cited by examiner

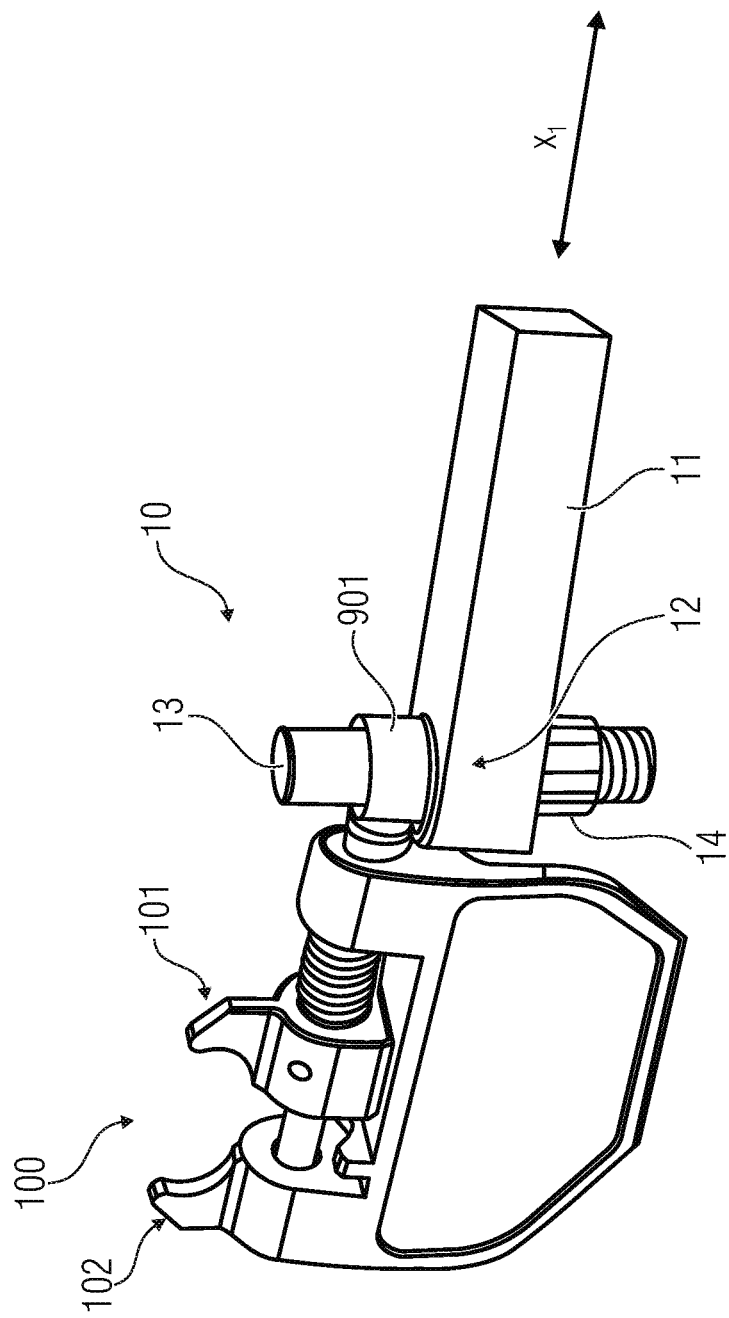

MULTIFUNCTIONAL TOOL HAVING A DEVICE FOR ACTUATING A QUICK RELEASE CHAIN FASTENER

CROSS-REFERENCE TO RELATED APPLICATIONS

This application is a continuation of co-pending International Application No. PCT/EP2016/071576, filed Sep. 13, 2016, which is incorporated herein by reference in its entirety, and additionally claims priority from International Application No. PCT/EP2015/071492, filed Sep. 18, 2015, which is also incorporated herein by reference in its entirety.

BACKGROUND OF THE INVENTION

The invention relates to a portable multifunctional tool having a tool function element for actuating quick release chain fasteners and having the features of claim 1, and to a tool function element having the features of claim 22.

Nowadays, different power transmission means for transmitting a driving force to the wheels to be driven are known in mobiles, or vehicles. For example, transmission of the driving force may be accomplished by means of chains. It is known, for example, in motor-driven vehicles to use a drive chain for directing the power from the engine, or a transmission gear downstream thereof, to the wheels to be driven. In classic bicycles without any auxiliary engine, the drive chain is utilized for directing the muscle power provided by the rider from the foot pedal to the wheel to be driven.

Such chains, or drive chains, nowadays are predominately configured as so called roller chains or bolt chains. Said chains typically consist of several chain links, each chain link in turn comprising two link plates arranged opposite each other. The two link plates of a chain link are interconnected by means of chain link plate connection means such as rivets, bolts and/or rolls, for example, which are arranged between the link plates. Such a chain is known from EP 1 245 862 A2, for example.

Adjacent chain links of a chain alternately comprise so called inner link plates and outer link plates, the two inner link plates of a chain link comprising a mutual distance smaller than that between two outer link plates of an adjacent chain link.

The dimension of the inner link plates is configured such that the outer surfaces of the two inner link plates of a chain link border on the inner surfaces of the two outer link plates of the respectively adjacent chain link. The two inner link plates of the chain link are inserted, as it were, into the two outer link plates of the respectively adjacent chain link.

Each inner link plate and each outer link plate comprises a hole at each of both its ends which are located externally as seen in the direction of travel. When the inner link plates are inserted into the outer link plates, the ends of the link plates are oriented with regard to each other such that the holes of one inner link plate are aligned with the holes of an adjacent outer link plate. By means of said holes aligned with one another, bolts or rivets are pressed to connect the link plates, and, thus, the individual chain links, with one another. A press fit between the rivets and the holes ensures attachment. Moreover, bushings or chain rollers may be arranged around the rivets. In this manner, an endless chain is produced in the form of a bolt, or roller, chain.

Such chains are very stable and enable large tensile forces. However, handling during replacement of individual chain links involves a large amount of effort and is complicated. Here, the rivets of a chain link to be replaced or of a segment which consists of several chain links and is to be replaced must be fully removed by being pressed out. Subsequently, new rivets must be inserted and pushed in and pressed in again. This is typically done by using a tool specifically provided for this purpose.

Such special tools for mobile use are known from the area of bicycles, for example. They are so called chain riveting tools, which are available as parts of a multi-part multifunctional tool with compact dimensions. Such a chain riveting tool comprises an accommodating portion into which two adjacent chain links of chain are inserted. The chain riveting tool also comprises a so called chain rivet breaking pin oriented orthogonally to the inserted chain, or in a manner that is transverse to the longitudinal chain direction. For breaking, or opening, a chain, the chain rivet breaking pin is oriented toward the rivet to be removed and is translationally moved toward said rivet. By continuing the translational movement, the chain rivet breaking pin presses the rivet out of the chain link plates.

Such rivet attachments of a chain are indeed very stable. However, breaking such a rivet connection of a chain is time-consuming and sometimes cumbersome since the rivets are relatively small and are thus awkward to handle.

In order to make it easier to break and connect individual links of a chain, so called quick release chain fasteners are known, which are also referred to as chain locks. Such a chain lock is known, e.g., from EP 1 816 372 A2 and is shown in FIGS. 10, 11 and 12 by way of example. The quick release chain fastener 1000 comprises two complementary outer link plates 1001A, 1002A, each comprising a fixedly connected rivet 1001B, 1002B. The rivet 1001B protrudes from the inside 1003 of the respective outer link plate 1001A and comprises, at its free end 1005 located opposite the outer link plate 1001A, a portion 1006 having a reduced diameter.

The fixed rivet 1001B is arranged at an end 1007 of the outer link plate 1001A which is located externally as seen in the direction of travel. On the opposite end 1008 located externally as seen in the direction of travel, the outer link plate 1001A comprises an elongated hole 1009. On that side 1011 of the elongated hole 1009 which faces the fixed rivet 1001B, said elongated hole comprises a portion 1012 having an enlarged diameter.

In order to connect a chain with the quick release chain fastener 1000, the rivets 1001B, 1002B of the two outer link plates 1001A, 1002A of the quick release chain fastener are placed into holes of two inner link plates of a respectively adjacent chain link (not shown here). That respective end 1005 of the rivets 1001B, 1002B of the two outer link plates 1001A, 1002A of the quick release chain fastener which passes through the inner link plate links is guided through the portion 1012 having an enlarged diameter of that complementary outer link plate 1001A, 1002A of the quick release chain fastener which is located opposite, respectively. Subsequently, the chain (not shown here) is subjected to a tensile load in opposite directions $F_1$, $F_2$ (FIG. 11).

Due to the tensile force $F_1$, $F_2$ being exerted, the portion 1005 having a reduced diameter of the respective rivet 1001B slides to that side 1013 of the elongated hole 1009 which faces away from the fixed rivet 1001B, and becomes wedged there, due to a press fit, within a portion 1014 having a reduced diameter which is formed within the elongated hole 1009. Thus, the quick release chain fastener 1000 is fixed in the position shown in FIGS. 10, 11, 12, and the chain (which is not shown here) is tightly locked. Thus, riveting of individual chain links may be dispensed with.

Again, there are specific tools for disconnecting a chain locked by means of a quick release chain fastener. So called chain pliers are known for this purpose. The front ends of chain pliers are introduced into the inner link plates of the chain links adjacent to the quick release chain fastener and come to abut on the fixed rivets of the quick release chain fastener. When the chain pliers are actuated, the front ends of the pliers close in a known manner. The rivets fixed within the quick release chain fastener are thus pressed toward each other and slide along, within the elongated hole, toward the portion having the larger diameter. Once they have arrived there, the rivets can be removed by laterally pulling out the complementary link plates of the quick release chain fastener. The quick release chain fastener is thus opened, and the chain can be disconnected.

Such chain pliers are simple means for disconnecting and opening chains having been locked by means of a quick release chain fastener. Unlike the above described chain riveting tool, the two halves of the pliers perform a rotational movement about the common joint of the pliers. A lever arm must therefore be provided for creating the force to release a quick release chain fastener. For this reason, pliers have relatively long handles. As compared to the above-mentioned mobile chain riveting tool exhibiting compact dimensions, the chain pliers are therefore relatively large and unwieldy.

It is an object of the present invention to improve devices for opening a quick release chain fastener such that they are easy to handle while having a compact size.

SUMMARY

According to an embodiment, a portable multifunctional tool may have: a handle portion and a tool accommodating portion having at least one tool function element arranged thereon, the tool function element being configured to actuate a quick release chain fastener having two chain link plates and two chain link plate connection means, and the tool function element having: first force exertion means configured to exert a force on the first chain link plate connection means of the quick release chain fastener, and second force exertion means configured to exert a force on the second chain link plate connection means of the quick release chain fastener, the first force exertion means and the second force exertion means being translationally moveable in relation to each other so as to actuate the quick release chain fastener by means of this translational movement, and the tool function element having linear guide means having a stationary first linear guide element and a second linear guide element movably arranged within the former, at least one of the two force exertion means being arranged on the second linear guide element.

According to another embodiment, a tool function element for a portable multifunctional tool, the tool function element being configured to actuate a quick release chain fastener having two chain link plates and two chain link plate connection means, may have: first force exertion means configured to exert a force on the first chain link plate connection means of the quick release chain fastener, and second force exertion means configured to exert a force on the second chain link plate connection means of the quick release chain fastener, the first force exertion means and the second force exertion means being translationally moveable in relation to each other so as to actuate the quick release chain fastener by means of this translational movement, and the tool function element having linear guide means having a stationary first linear guide element and a second linear guide element movably arranged within the former, at least one of the two force exertion means being arranged on the second linear guide element.

The inventive multifunctional tool comprises a handle portion and a tool accommodating portion which has a tool function element arranged thereon. The tool function element is configured to actuate, i.e., to open and/or close, the quick release chain fastener comprising two chain link plates and two chain link plate connection means. The inventive multifunctional tool is also suited for opening and/or closing a chain locked or to be locked with such a quick release chain fastener. The quick release chain fastener can be actuated in that the chain link plate connection means are moved in relation to one another. Within a chain, the quick release chain fastener is a chain link of said chain. The first force exertion means is configured to exert a force on the first chain link plate connection means of the quick release chain fastener, and the second force exertion means is configured to exert a force on the second chain link plate connection means of the quick release chain fastener. According to the invention, the two force exertion means are translationally movable in relation to each other. By means of this translational movement, the respective forces can be transmitted to and exerted on the respective chain link plate connection means by means of the force exertion means. Due to this force being exerted, the rivets of the quick release chain fastener which are typically fixedly connected to a chain link plate can be pushed out of their press fit provided within the respectively opposite chain link plate, and/or can be pushed into same, and the chain lock, or the entire chain, can thus be opened or closed, respectively. Due to the inventive translational relative movement of the two force exertion means, a rotational movement as is customary with chain pliers can be dispensed with in the inventive multifunctional tool. The inventive multifunctional tool therefore does not require any long lever arms as an actuation device, as are customary with chain pliers. Therefore, the inventive multifunctional tool can exhibit compact dimensions. A translational movement of the two force exertion means in relation to each other can be effected in a simple manner, for example by simply displacing the two force exertion means. Thus, the inventive multifunctional tool and/or the tool function element arranged thereon can be handled in a simple and intuitive manner. According to the invention, the tool function element further comprises a linear guide means having a stationary first linear guide element and a second linear guide element movably arranged within the former. Only one of the two force exertion means is arranged on the movable second linear guide element. There are known chain tensioners wherein both force exertion means are arranged on a linear guide element (e.g. a threaded bolt). As compared to said known chain tensioners, the second linear guide element may be configured to be substantially shorter in the inventive tool function element, however, since it needs to accommodate only one of the two force exertion means. Consequently, the inventive multifunctional tool may be configured to be considerably more compact than known chain tensioners.

In accordance with an embodiment, the one of the two force exertion means may be arranged on the second linear guide element in a motion-coupled manner so that the second linear guide element and the force exertion means arranged thereon together move in the same direction. Moving together is to be understood to mean that the second linear guide element and the force exertion means arranged thereon perform the same movement in the same direction at the same speed. This also distinguishes the present invention from known chain fasteners, wherein rotation of the linear guide element (threaded bolt) causes a translational movement of the two force exertion means running on the threaded bolt. However, in the invention a translational movement of the second linear guide element involves the force exertion means arranged thereon being translationally moved in the same manner. In other words, with known chain fasteners, the force exertion means arranged on the threaded bolt will move to and fro on the threaded bolt upon rotation of the latter, i.e., the force exertion means will move translationally in relation to the linear guide element. In the invention, however, the force exertion means arranged on the linear guide element will not move to and fro on the linear guide element, i.e., the force exertion means will not move translationally in relation to the linear guide element. This is also to be understood by the term "motion-coupled", i.e., there is no translational relative movement between the linear guide element and the force exertion means arranged thereon.

In accordance with a further embodiment, the second linear guide element and the force exertion means arranged thereon may move together toward the respectively other force exertion means. Since only one of the two force exertion means is arranged on the second linear guide element, the other one of the two force exertion means may be arranged thereon in a stationary manner, for example, i.e., without any movement in relation to the tool function element. The second linear guide element and the force exertion means arranged thereon, however, are arranged on the tool function element such that they are moveable in relation thereto.

It is feasible for the second linear guide element to be moveable in a first direction so as to open the quick release chain fastener, and for the force exertion means arranged on the second linear guide element to be arranged, in this first direction of movement, in front of the first linear guide element. This arrangement also contributes to reducing the length of the second linear guide element as compared to known devices so as to thus obtain a compact multifunctional tool.

It is conceivable for the tool function element to comprise a stationary bearing portion at which the second force exertion means is mounted, said bearing portion being spaced apartment from the first linear guide element and being arranged opposite thereto along the direction of movement of the second linear guide element. As was already mentioned, a stationary bearing portion is to be understood to mean a bearing portion which has no movement in relation to the tool function element. This stationary bearing portion has the respectively other one of the two force exertion means arranged thereon. This means that the force exertion means arranged on the moveable second linear guide element moves in relation to the force exertion means arranged on the stationary first linear guide element.

It is also feasible for the second linear guide element to comprise a threaded portion which extends through the first linear guide element but not through the stationary bearing portion. The first linear guide element may comprise an internal thread complementary to the threaded portion of the second linear guide element. Thus, the thread converts a rotation of the second linear guide element to a translational movement of the second linear guide element in relation to the first linear guide element. However, the threaded portion of the second linear guide element here does not extend through the oppositely arranged bearing portion on which the other one of the two force exertion means is arranged. This means that the respectively other one of the two force exertion means is arranged on the bearing portion rather than on the second linear guide element.

According to a feasible embodiment, the stationary first linear guide element and the stationary bearing portion may be configured in one piece. In other words, both the first linear guide element and the bearing portion may be stationarily arranged on the tool function element. Thus, both the first linear guide element and the bearing portion may be configured in one piece with the tool function element.

It is conceivable for a guide portion to be configured between the stationary first linear guide element and the stationary bearing portion, which guide portion comprises a first running surface and for the force exertion means arranged on the second linear guide element to comprise a second running surface complementary thereto, the two running surfaces supporting the force exertion means against rotation during a linear movement. The two running surfaces may be configured as parallel-plane surfaces, for example, so that said surfaces prevent the force exertion means arranged on the second linear guide element from rotating and/or tilting orthogonally to its linear movement direction.

It is further conceivable for at least one of the two force exertion means to comprise an accommodating portion for accommodating the quick release chain fastener, said accommodating portion being configured to avoid tilting of the quick release chain fastener along the longitudinal chain axis. In this manner, the quick release chain fastener can be seated within, or held by, the accommodating portion so that opening and/or closing of the quick release chain fastener is simplified. If the quick release chain fastener is arranged within a chain, such an accommodating portion may also serve to seat adjacent chain links. The accommodating portion may thus support the chain against, e.g., twisting, i.e. against a torsional force, or rotation, which acts in the longitudinal chain direction. Installation and/or removal of a quick release chain fastener are thus simplified.

The accommodating portion may comprise an engagement portion configured to engage between two chain link plates of a chain link adjacent to the quick release chain fastener when the quick release chain fastener is arranged within a chain. For example, both force exertion means may each comprise an accommodating portion having such an engagement portion. Each engagement portion may engage into the gap formed between the two link plates of a chain link adjacent to the quick release chain fastener. The lateral dimensions of the respective engagement portion may approximately correspond to the distance of the two chain link plates, i.e. to the dimensions of the respective chain link plate gap, of the respective chain link, so that there will be a form fit, or clearance fit, between the engagement portion and the chain link plate gap of the chain link. Thus, the engagement portion might engage into the chain link plate gap of an adjacent chain link in a more or less accurately fitting manner. Thus, the adjacent chain links may simply be mounted on an inventive tool function element so as to simplify assembly and/or disassembly of the quick release chain fastener arranged between said chain links.

Here, it is feasible for the accommodating portion and/or the engagement portion to comprise a thickness of between 1 mm and 2 mm which is to be measured orthogonally to the linear movement direction. This thickness has proved to be particularly advantageous for machining, in particular, bicycle chains by using the inventive multifunctional tool. The indicated thickness of between 1 mm and 2 mm fits well in between the inner link plates of a bicycle chain while offering sufficient stability for actuating a quick release chain fastener of a bicycle chain.

It would also be feasible for the accommodating portion to comprise a contact portion which can be brought into contact with a chain link plate connection means of a quick release chain fastener, said contact portion comprising a radius essentially corresponding to the radius of the chain link plate connection means. Thus, the contact portion may comprise, e.g., a shape that is complementary to that of the chain link plate connection means. For example, if the chain link plate connection means is a round rivet or bolt, which additionally may also be surrounded by a round chain roller, the contact portion may also have a round shape, the radius of which roughly corresponds to the radius of the chain link plate connection means. Advantageously, the radius of the contact portion may be larger than that of the chain link plate connection means. Thus, the chain link plate connection means will fit into the contact portion, as it were, and may be safely accommodated and retained, or seated, by same. This enables safe guidance of the respective chain link plate connection means when performing the translational movement and/or when exerting the force on the chain link plate connection means by means of the force exertion means.

Here, it is feasible for the radius to amount to from 3.5 mm to 4.0 mm, advantageously from 3.7 mm to 3.9 mm, and more advantageously to 3.8 mm. Said radii approximately correspond to the radii of chain rollers used in bicycle chains. Thus, chain rollers of bicycle chains are stably held within the contact portion of the force exertion means.

It is feasible for the tool accommodating portion to comprise a bolt extending transversely, in particular perpendicularly, to a main extension direction of the handle portion, the at least one tool function element being arranged on said bolt. By means of such a bolt, a simple possibility of attaching the inventive tool function element to the handle portions of the multifunctional tool may be implemented. Arranging the bolt transversely to the main extension direction of the handle portion also ensures compact structural dimensions of the multifunctional tool. The main extension direction of the handle portion is that extension direction in which the handle portion to be grasped by a user mainly extends.

According to a feasible embodiment of the inventive multifunctional tool, the at least one tool function element may comprise a mounting portion by means of which the tool function element is mounted on the bolt, said mounting portion comprising an opening through which the bolt may be passed. Thus, a simple possibility of mounting the tool function element on the inventive multifunctional tool may be ensured. The tool function element is lined up, as it were, on the bolt and is connected to the handle portion by means of the bolt.

It is feasible for the at least one tool function element to be rotatably arranged on the tool accommodating portion. Thus, the tool function element may be folded in during non-use, for example, which again is conducive to compact structural dimensions of the inventive multifunctional tool.

It is conceivable for the tool accommodating portion to be bipartite and for the mounting portion of the at least one tool function element to be arranged between the two parts of the tool accommodating portion. In this manner, the tool function element may be arranged between the two parts of the bipartite tool accommodating portion, i.e. within one part of the multifunctional tool, as it were, in particular when the tool function element is folded in. Consequently, the tool function element is arranged in a protected manner so that it cannot accidentally be damaged or so that a user cannot injure himself/herself with it.

It is feasible for the handle portion to be bipartite, the first part of the handle portion being formed in one piece with a first part of the tool accommodating portion, and the second part of the handle portion being formed in one piece with a second part of the tool accommodating portion. Such one-piece implementation of the handle portion and the tool accommodating portion may be easy and cheap to produce.

In addition, it is conceivable for the multifunctional tool to comprise a second tool accommodating portion arranged opposite the first tool accommodating portion. The second tool accommodating portion may also have at least one tool function element arranged thereon. In this embodiment, therefore, one tool accommodating portion may be provided with one or more tool function elements on both sides, e.g. on both ends of the multifunctional tool, so that the multifunctional tool may provide clearly more functions in the form of many different tool function elements.

In one embodiment, the first and second tool accommodating portions may comprise a common sectional axis extending in parallel with the main extension direction of the handle portion. Both tool accommodating portions, or the tool function elements arranged thereon, are therefore arranged in a mutually symmetrical manner, so that tool function elements that are folded in are located opposite one another. In this manner, a compact structural shape of the inventive multifunctional tool, in particular a compact structural shape in the main extension direction, is achieved.

In accordance with a further feasible embodiment, the first and second tool accommodating portions may comprise a common sectional axis extending obliquely to the main extension direction of the handle portion. In one such embodiment, the common sectional axis may additionally extend, for example, through the center of the handle portion. In this manner, a compact structural shape of the inventive multifunctional tool, in particular a compact structural shape in a direction perpendicular to the main extension direction, is achieved.

It is conceivable for both force exertion means of the at least one tool function element to be translationally movable in relation to each other along a common axis of translation. A translational movement is particularly well suited for actuating a quick release chain fastener. In addition, this offers the advantage that the relative movement between the two force exertion means can be implemented in a simple manner. As a result, handling of the multifunctional tool is made easier since both force exertion means are movable in relation to each other on the same axis and since the multifunctional tool can thus be operated in an intuitive manner.

It is feasible for the tool function element to be configured such that both force exertion means are movable in relation to each other in an exclusively translational manner. In conventional chain pliers, a rotational movement is performed in addition to a translational movement on account of their hinge joints. On account of the relative translational movability, which is exclusive in the inventive multifunctional tool, an additional rotational movement as is customary in known chain pliers for applying the force may be fully dispensed with. In addition, no long lever arms are required, which results in an inventive multifunctional tool with compact dimensions.

It is feasible for the accommodating portion to comprise a retaining section configured to secure the quick release chain fastener against tilting along an axis extending in a manner that is transverse to the longitudinal chain axis or against a movement directed out of the accommodating portion. Thus, the quick release chain fastener may be safely accommodated and retained, or seated, by the retaining portion during opening and/or closing. The retaining portion prevents the quick release chain fastener within the tool function element from tilting during actuation and from possibly popping out of the tool function element.

It is conceivable that the tool function element comprises a linear guide means, the linear guide means comprising a first linear guide element and a second linear guide element, and the first linear guide element being translationally moveable in relation to the second linear guide element, and at least one of the two force exertions means being arranged at one of the first and second linear guide elements. The linear guide means enables a linear translational movement. Since at least one of the force exertion means is mounted on the first or second movable linear guide element of the linear guide means, said force exertion means may also move in a linearly translational manner in relation to the respectively other force exertion means. Thus, a linear translational relative movement of the two force exertion means may be accomplished and improved by means of the linear guide means.

In one embodiment, the at least one of the two force exertion means is arranged on the first or the second linear guide element in a rotationally movable manner. In a further embodiment, the at least one of the two force exertion means is arranged on the first or the second linear guide element in a translationally movable manner. In yet another embodiment, the at least one of the two force exertion means is arranged on the first or the second linear guide element in a rotationally and translationally movable manner. For example, a first linear guide element may be provided as a bearing, and a second linear guide element may be provided as a bolt seated therein, one of the two force exertion means being arranged on the bolt. Should the bolt itself not be movable within the bearing, the translationally and/or rotationally movable attachment of the force exertion means on this bolt serves the purpose that the force exertion means is linearly guided by the bolt while performing a translational movement in relation to the other force exertion means. Due to the rotational movability, the force exertion means may be movable, e.g., about the linear guide element and may be pivotable about same, for example. A linear guide element makes it easier for a straight-line translational movement of the two force exertion means to be performed in relation to each other. The linear guide element may be a bolt, for example, on which one or both force exertion means may slide along the longitudinal bolt axis. The magnitude of the translational movement may be limited, for example, by a circlip or cotter pin provided on the end of the bolt. Further guides such as slots and keys, for example, provided on the bolts and the force exertion means, may secure the force exertion means on the bolt against rotation. However, in accordance with embodiments, rotation of the force exertion means on the bolt may be desirable.

It is feasible for the tool function element to comprise a bearing, wherein the force exertion means that is not arranged at any of the two linear guide elements is mounted to said bearing in a translationally fixed manner The bearing may enable rotation of the seated force exertion means about a rotational axis extending in parallel with the longitudinal chain axis, which in turn makes it easier to orient the tool function element toward a chain. However, the bearing fixates the seated force exertion means against translational movement, so that the other one of the two force exertion means may move in relation to the seated force exertion means.

In one embodiment, the first linear guide element may comprise an internal thread, and the second linear guide element may comprise an external thread engaged with said internal thread, wherein one of the two force exertion means is arranged at the first linear guide element and the translational relative movement of the two force exertion means in relation to each other is provided by rotation of the mutually engaged threads of the two linear guide elements. For example, For example, the second linear guide element may be a threaded bolt. The first linear guide element may be a bearing comprising a complementary internal thread. The threaded bolt may be rotated, so that the threaded bolt is supported on the bearing and performs a translational movement. This offers a simple possibility of implementing a compact multifunctional tool having a tool function element and providing linear translational relative movement of the two force exertion means in relation to each other. On account of the threads, transmission of forces can take place, which makes it easier to actuate the quick release chain fastener. Long lever arms as are used with chain pliers are not required for transmission of forces here.

It is feasible for one of the two force exertion means to be configured in one piece with the tool function element. This offers a simple possibility of manufacturing the multifunctional tool. In addition, a one-piece configuration has the advantage of exhibiting increased stability as compared to separate connections.

It is further feasible for at least one of the force exertion means to be configured to exert a force on the respective chain link plate connection means which acts in the longitudinal chain direction, for example. In other words, the first and/or the second force exertion means may thus be configured to exert a force on the respective chain link plate connection means which acts in the longitudinal chain direction, for example. The longitudinal chain direction is understood to mean that direction in which the chain extends, for example in which the individual links of the chain are arranged one after the other, i.e. in series. Starting from a chain link plate connection means of a chain link arranged in a chain, a force acting in the longitudinal chain direction can therefore be a force directed from this chain link plate connection means to the opposite chain link plate connection means of the same chain link plate, or a force acting in the opposite direction, i.e. a force directed from this chain link plate connection means toward a most closely adjacent chain link. The force exertion means may thus exert a tensile and/or compressive force, as viewed in the longitudinal chain direction, on the chain link plate connection means of the quick release chain fastener.

It is conceivable for at least one of the two force exertion means to be configured such that the force exerted on the first chain link plate connection means and the force exerted on the second chain link plate connection means are approximately oppositely directed. In other words, the chain link plate connection means can be pulled or pushed away from each other, for example, due to the oppositely acting forces applied by means of the force exertion means, so as to lock the quick release chain fastener, or may be pushed or pulled toward each other so as to open the quick release chain fastener. For this purpose, the translational movement provided in accordance with the invention for exerting the oppositely acting forces is advantageous since the elongated holes provided in known quick release chain fasteners comprise longitudinal sides which extend in parallel and which typically extend in a linear manner, or in a straight line. The translational movement may also be configurable in a straight line. A rotational movement, however, as is known from chain pliers, for example, is less suitable for actuating such a quick release chain fastener comprising straight-line longitudinal sides of an elongated hole.

It is feasible for at least one of the two force exertion means to exert the force directly on the respective chain link plate connection means. Thus, transmission of forces can be effected directly. This can be achieved, for example, in that a force exertion means comes to abut directly on the respective chain link plate connection means. A chain link plate connection means may be a rivet or a bolt, for example. An optional chain roller arranged around a rivet or bolt may also be part of a chain link plate connection means. In some quick release chain fasteners, the rivet fixedly connected to a chain link plate of the quick release chain fastener is passed through an opening of a chain roller provided in an adjacent chain link, for example. The rivet fixedly connected to the chain link plate of the quick release chain fastener is thus surrounded by this chain roller of the neighboring link, and this unit consisting of a rivet and its surrounding chain roller is also considered to be a chain link plate connection means in the context of this patent application. Therefore, a force exerted on this chain roller by means of an inventive force exertion means is to be understood as a force exerted directly on the chain link plate connection means. The force exerted directly on the respective chain link plate connection means may be effected by means of an internal contact of the force exertion means with the respective chain link plate connection means. In other words, the force exertion means contact the mutually facing sides of two oppositely arranged chain link plate connection means of the quick release chain fastener. Alternatively, the force directly exerted on the respective chain link plate connection means may be effected by means of an external contact of the force exertion means with the respective chain link plate connection means. In other words, the force exertion means contact the sides, which face away from each other, of two oppositely arranged chain link plate connection means of the quick release chain fastener.

It is further conceivable for at least one of the two chain exertion means to exert the force on a chain link plate connection means indirectly via a chain link plate of the quick release chain fastener or via a chain link adjacent to the quick release chain fastener; the latter applies when the quick release chain fastener is arranged within a chain. Since the chain link plate connection means are fixedly connected to their respective chain link plates, a force exerted on the chain link plate will also be transmitted to the respective chain link plate connection means. Transmission of forces to the chain link plate connection means is therefore indirectly effected via the chain link plate. If the quick release chain fastener is arranged within a chain, the quick release chain fastener will be a link of said chain. Accordingly, the quick release chain fastener will then be connected with a first and an opposing second, i.e. a left and a right, adjacent chain link. According to this, a force exertion means of an inventive tool function element may be configured to exert the force on an adjacent chain link. This force will then be indirectly applied to the respective chain link plate connection means of the quick release chain fastener via said adjacent chain link. In other words, the quick release chain fastener can be opened and/or closed by means of an inventive tool function element in that the tool function element does not apply the force directly to the quick release chain fastener but applies it to adjacent chain links, which in turn will when transmit this force to the quick release chain fastener.

It is further feasible for the retaining portion to extend, at least in sections, beyond a center line extending through the chain link plate connection means in the longitudinal chain direction, and for the retaining portion to be in contact, at least in sections, with a portion of the chain link plate connection means which is arranged above the center line. The retaining portion at least partly encompasses, as it were, the chain link plate connection means. The retaining portion encompasses the chain link plate connection means from above at least in sections, i.e. the retaining portion at least partly encompasses a part of the chain link plate connection means that is located above the center line. The retaining portion retains, as it were, the chain link plate connection means and thus prevents the quick release chain fastener from hopping out of an inventive tool function element during opening and/or closing.

The invention relates to a multifunctional tool having an above-described inventive tool function element. Such multifunctional tools are known from cycling, for example. Said multifunctional tools are handy and compact and therefore usually portable. The above-described tool function element is provided as a part, or a bit, of this multifunctional tool. The tool function element is mounted on the multifunctional tool in an advantageously movable manner, so that the tool function element can be folded in and out as needed.

It is conceivable for at least one of the two force exertion means to be movably arranged on an inventive tool function element. This enables straightforward alignment when applying an inventive tool function element to a quick release chain fastener for the purpose of actuating same. For example, with a chain installed in a two-wheeled vehicle, the movable force exertion means may be easily brought close to the quick release chain fastener even if the chain is difficult to access. A further advantage consists in that a rotatable force exertion means may be folded in, for example, when an inventive tool function element is not needed, so that same may be stowed away in a place-saving manner.

BRIEF DESCRIPTION OF THE DRAWINGS

Embodiments of the present invention will be detailed subsequently referring to the drawings, in which:

FIG. 1A shows a perspective view of an inventive multifunctional tool;

DETAILED DESCRIPTION OF THE INVENTION

Figure 1B:
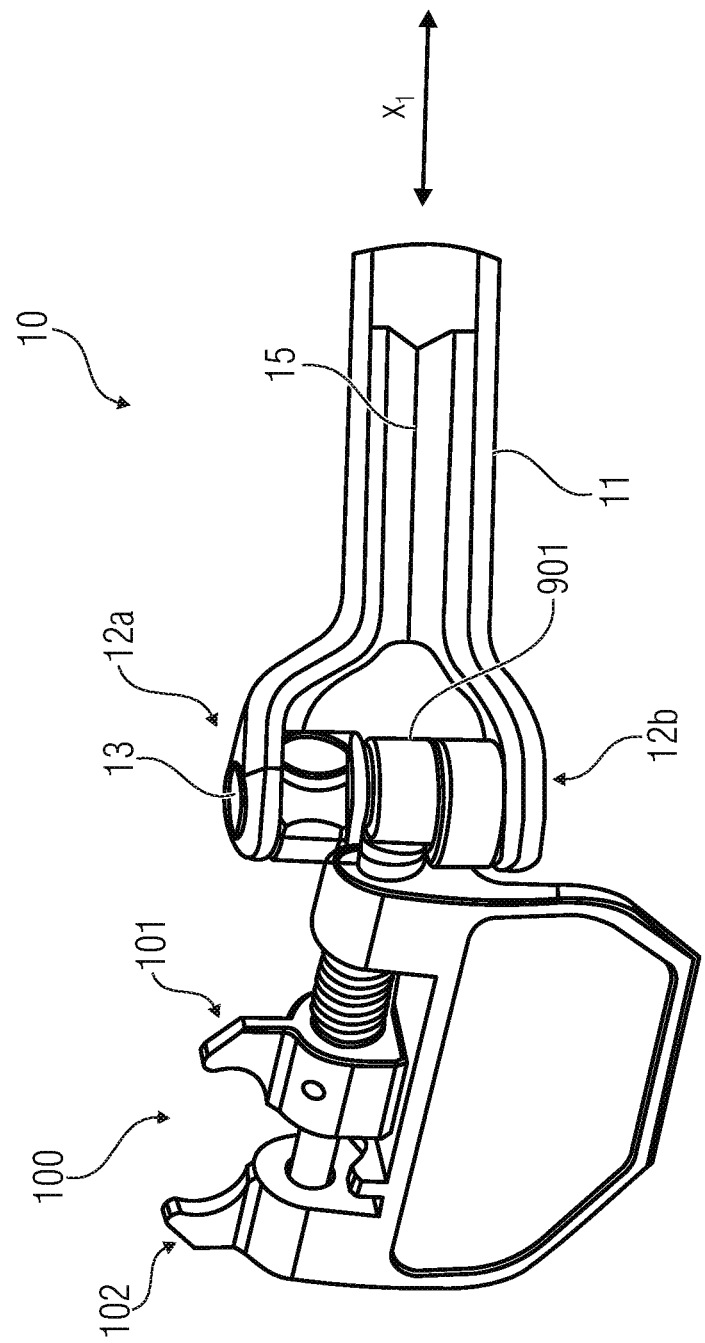
FIG. 1B shows a perspective view of a further inventive multifunctional tool.

FIG. 1A shows an embodiment of an inventive portable multifunctional tool 10. The multifunctional tool 10 comprises a handle portion 11 with which a user may hold the multifunctional tool 10.

The handle portion 11 moreover comprises a tool accommodating portion 12 having a tool function element 100 arranged thereon. The tool function element 100 is configured to actuate, i.e. to open and/or to close, a quick release chain fastener 502, 1000 (FIGS. 10, 11, 12) comprising two chain link plates 1001A, 1002A and chain link plate connection means 1001B, 1002B. Different embodiments of inventive tool function elements 100, 200 will be described in detail below with reference to FIGS. 1H to 9.

The tool function element 100 depicted here comprises, inter alia, first force exertion means 101. The first force exertion means 101 is configured to exert a force $F_1$, $F_2$ (FIG. 11) on the first chain link plate connection means 1001B of the quick release chain fastener 502, 1000.

The tool function element 100 also comprises second force exertion means 102 configured to exert a force F1, F2 on the second chain link plate connection means 1002B of the quick release chain fastener 502, 1000.

According to the invention, the first force exertion means 101 and the second force exertion means 102 are translationally movable in relation to each other so as to actuate the quick release chain fastener 502, 1000 by means of said translational movement.

A multifunctional tool 10 is to be understood to mean a tool which combines several functions, e.g. a screwing function, a cutting function, a pressing function and the like. To this end, a multifunctional tool 10 typically comprises one or more tool function elements 100 with which the respective desired function can be performed. Said tool function elements 100 are colloquially also referred to as bits.

By means of the inventive tool function element 100, a quick release chain fastener 502, 1000 may be actuated, i.e. may be both opened and closed. Thus, the depicted tool function element 100 already performs several functions (opening and closing), and the inventive multifunctional tool 10 may be referred to as such.

The inventive multifunctional tool 10, or the handle portion 11, comprises a main extension direction $X_1$. The tool accommodating portion 12 of the multifunctional tool 10 comprises a bolt 13 extending transversely, advantageously perpendicularly, to the main extension direction $X_1$ of the handle portion 11. The tool function element 100 is arranged on said bolt 13.

In the embodiment shown in FIG. 1A, the tool accommodating portion 12 comprises an opening through which the bolt 13 extends. The bolt 13 may be attached, by means of suitable securing means such as a nut 14, for example, to the tool mounting portion 12. The bolt 13 may be pivoted within the tool mounting portion 12. Advantageously, however, the bolt 13 is not rotatably fixed within the tool mounting portion 12.

As was mentioned at the outset, the tool mounting portion 12 serves to mount one or more tool function elements 100 thereon so as to connect same to the handle portion 11 of the multifunctional tool 10.

To this end, the tool function element 100 itself also comprises a mounting portion 901. The mounting portion 901 of the tool function element 100 is mounted, to this end, on the tool accommodating portion 12 of the multifunctional tool 10. The mounting portion 901 here is configured as an eye 902 comprising an opening 903 (FIG. 9), the bolt 13 being passed through said opening 903. The mounting portion 901 will be described in more detail below with reference to FIG. 9.

FIG. 1B shows a further embodiment of an inventive multifunctional tool 10. Said embodiment differs from the embodiment shown in FIG. 1A in that the handle portion 11 indeed is still configured in one piece, but the tool accommodating portion 12 is bipartite. The tool accommodating portion 12 comprises a first part 12a and an oppositely arranged second part 12b. The tool accommodating portion 12 is that portion of the multifunctional tool 10 which has a tool function element 100 arranged thereon, in this case by means of the bolt 13, so as to be coupled to the handle portion 11.

Here, the tool accommodating portion 12 is configured in the form of a yoke. The tool function element 100 is arranged between both parts 12a, 12b of the tool accommodating portion 12. More specifically, the mounting portion 901 of the tool function element 100 is arranged between the two parts 12a, 12b of the tool accommodating portion 12.

The tool function element 100 is rotatably arranged on the tool accommodating portion 12, or the handle portion. In the embodiments shown in FIGS. 1A and 1B, the ability to rotate is due to the fact, for example, that the mounting portion 901 of the tool function element 100 is rotatably arranged on the bolt 13. Thus, the tool function element 100 may rotate in relation to the handle portion 11.

For example, the tool function element 100 may, in case it is no longer needed, be rotated from the folded-out position shown in FIG. 1B to a folded-in position (not shown). Here, the handle portion 11 and the tool function element 100 move toward each other. The tool function element 100 may be countersunk, e.g., at least party, in a recess 15 provided in the handle portion 11.

Figure 1C:
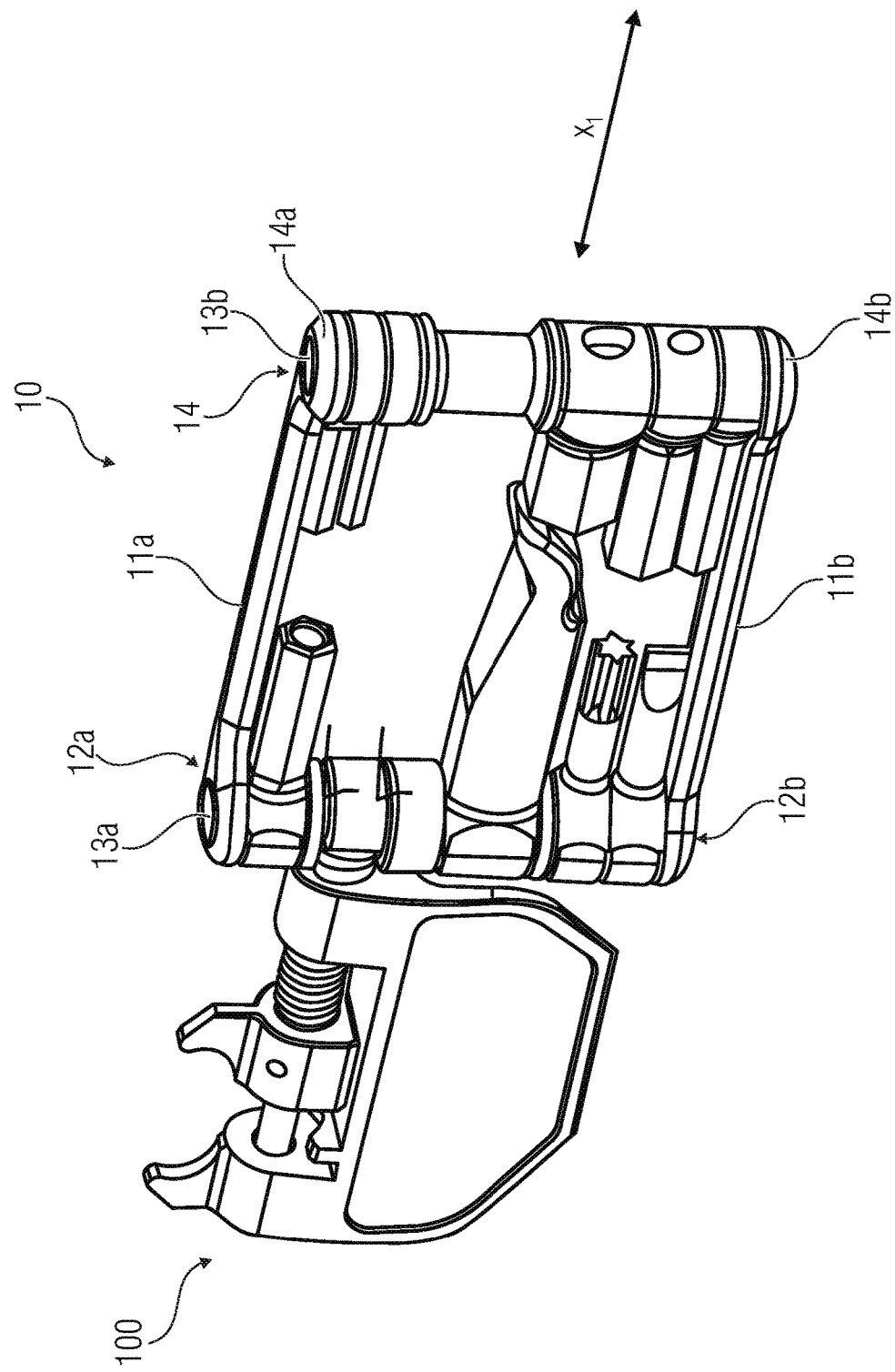
FIG. 1C shows a perspective view of a further inventive multifunctional tool having a folded-out inventive tool function element.

FIG. 1C shows a further embodiment of an inventive multifunctional tool 10. Here, in addition to the tool accommodating portion 12, also the handle portion 11 is bipartite, i.e. the handle portion 11 comprises a first handle part 11a and an opposite second handle part 11b. When the multifunctional tool 10 is used, one handle part 11a, 11b will typically lie within the user's palm, and the other one of the two handle parts 11a, 11b will be enclosed by the user's fingers.

The first handle part 11a comprises the first part 12a of the tool accommodating portion 12. The second handle part 11b comprises the opposite second part 12b of the tool accommodating portion 12. The first handle part 11a is configured in one piece with the first part 12a of the tool accommodating portion 12. The second handle part 11b is configured in one piece with the opposite second part 12b of the tool accommodating portion 12.

In addition, the handle portion 11 in this embodiment comprises a second tool accommodating portion 14, which is also bipartite. The first handle part 11a comprises the first part 14a of the second bipartite tool accommodating portion 14. The second handle part 11b comprises the opposite second part 14b of the second bipartite tool accommodating portion 14. The first handle part 11a is configured in one piece with the first part 14a of the second bipartite tool accommodating portion 14. The second handle part 11b is configured in one piece with the opposite second part 14b of the second bipartite tool accommodating portion 14.

The second tool accommodating portion 14 comprises a bolt 13b which extends transversely, advantageously perpendicularly, to the main extension direction $X_1$ of the handle portion 11.

As can be seen in FIG. 1C, each of both bolts 13a, 13b has a multitude of tool function elements arranged thereon. All of the tool function elements may be rotatably arranged on the respective bolt 13a, 13b, so that the tool function elements may be folded in or out. In FIG. 1C, for example, the tool function element 100 is folded out, whereas all of the other tool function elements are folded in.

Figure 1D:
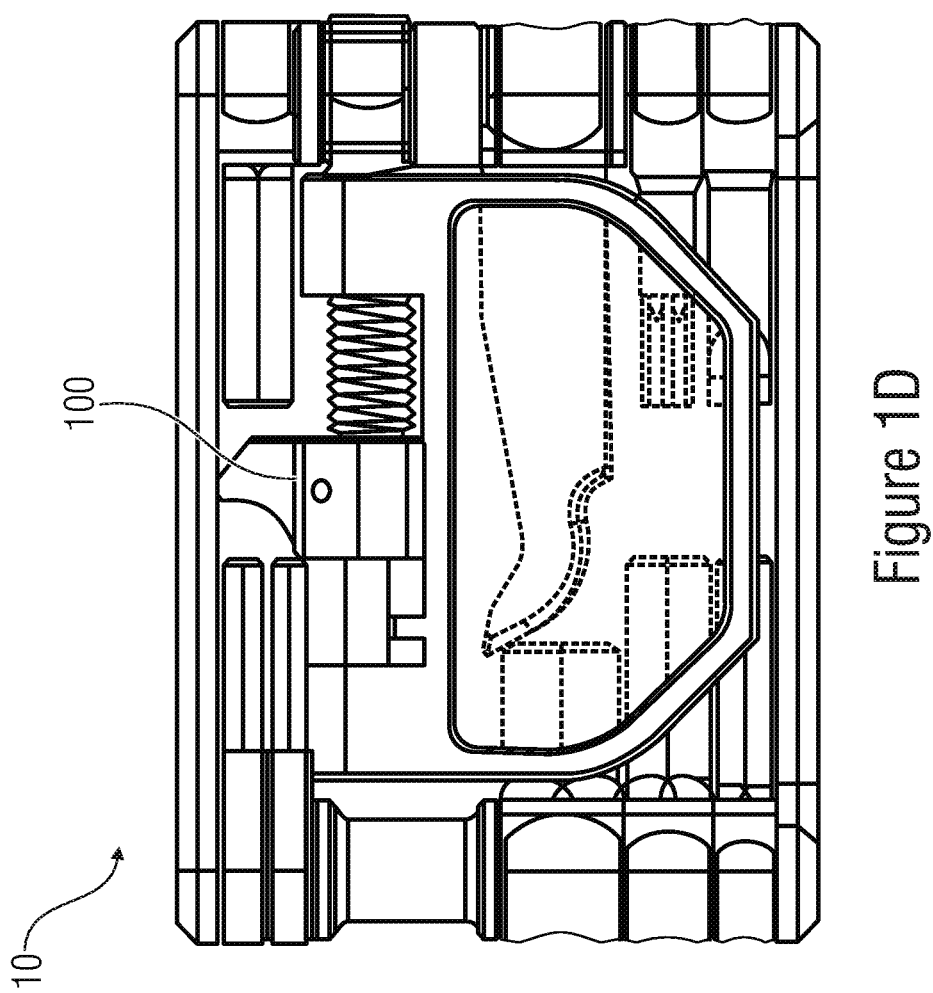
FIG. 1D shows a side view of the multifunctional tool of FIG. 1C having a folded-in inventive tool function element.
Figure 1E:
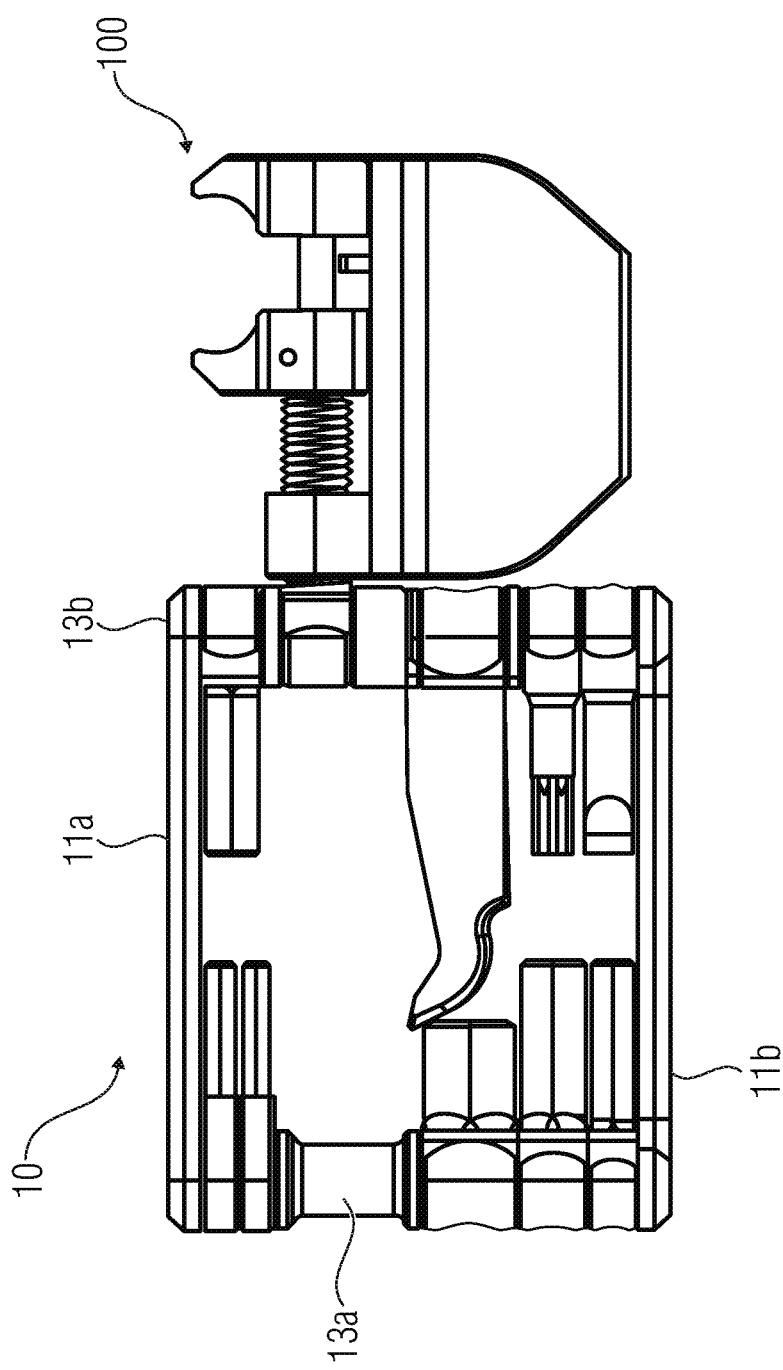
FIG. 1E shows a further side view of the multifunctional tool of FIG. 1C having a folded-out inventive tool function element.

FIG. 1D shows a side view of the inventive multifunctional tool 10. Here, all of the tool function elements are folded in, so that the portable multifunctional tool 10 has a space-saving arrangement. To illustrate this, the tool function elements arranged behind the inventive tool function element 100 are indicated in dashed lines.

FIG. 1E once again shows a side view of the inventive multifunctional tool 10. However, the tool function element 100 here is shown in a folded-out state, and the further tool function elements are now visible.

Figure 1F:
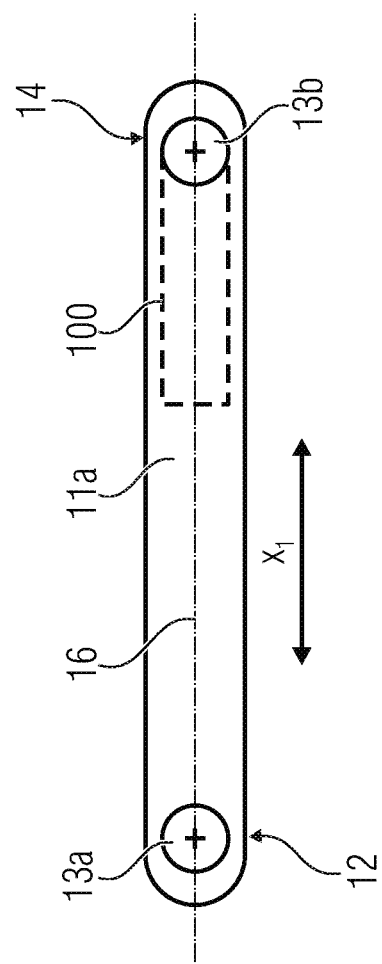
FIG. 1F shows a top view of an inventive multifunctional tool having a folded-in inventive tool function element.

FIG. 1F shows a top view of the first part 11a of the bipartite handle portion 11 with the tool function elements folded in. In the top view depicted, the tool function elements are arranged behind the first handle portion 11a and are therefore not visible. The inventive tool function element 100 is therefore indicated in dashed lines only.

Moreover, one can see both bolts 13a, 13b on which the tool function elements, and also the very inventive tool function element 100, are arranged. Both bolts 13a, 13b form part of the respective tool accommodating portion 12, 14. In addition, the main extension direction $X_1$ of the handle portion 11 is drawn in.

As can be seen, both tool accommodating portions 12, 14 and/or both bolts 13a, 13b are arranged opposite each other. The first and second tool accommodating portions 12, 14 and/or the first and second bolts 13a, 13b have a common sectional axis 16. In this embodiment, the common sectional axis 16 extends in parallel with the main extension direction $X_1$ of the handle portion 11 (which is bipartite here).

Figure 1G:
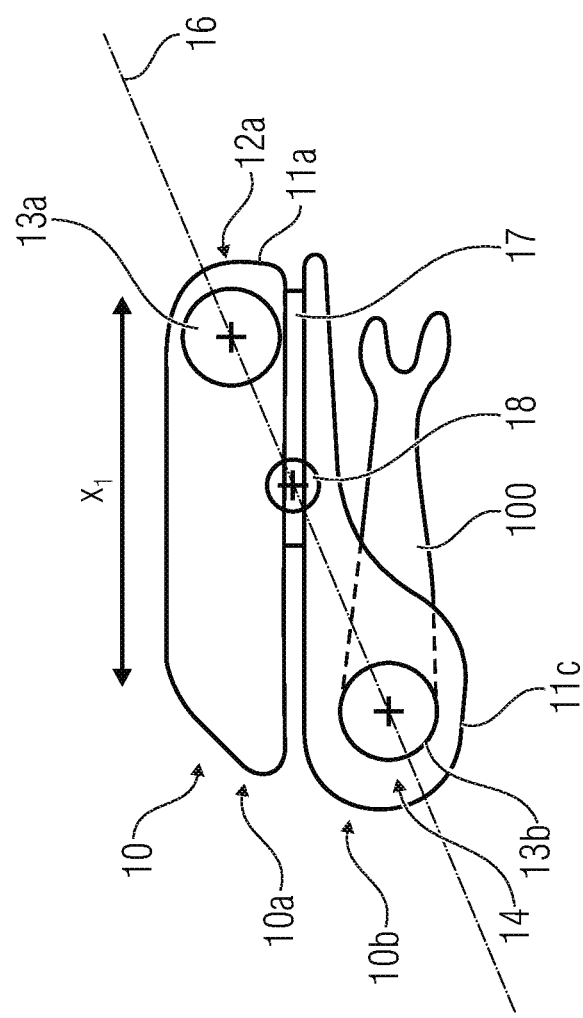
FIG. 1G shows a top view of a further inventive multifunctional tool having a folded-in inventive tool function element.

FIG. 1G shows a further embodiment of an inventive multifunctional tool 10. The multifunctional tool 10 comprises two components 10a, 10b which are arranged one above the other and are connected to each other, advantageously in a releasable manner, on a connection portion 17.

The multifunctional tool 10 comprises a multi-part handle portion 11. More specifically, the first tool component 10a comprises a first handle portion 11a. The first handle portion 11a in turn comprises a first tool accommodating portion 12a. The first tool accommodating portion 12a comprises a bolt 13a which has at least one tool function element arranged thereon.

The second tool component 10b comprises a second handle portion 11c. The second handle portion 11c comprises a second tool accommodating portion 14. The second tool accommodating portion 14 comprises a bolt 13b which has at least one tool function element 100 arranged thereon.

Here, too, the multi-part handle portion 11 comprises a main extension direction $X_1$. In addition, the multi-part handle portion 11 comprises a center 18 which may be located, e.g., in the area of the connection portion 17.

Both tool accommodating portions 12, 14 and/or both bolts 13a, 13b have a common sectional axis 16 extending in a manner that is oblique to the main extension direction $X_1$ of the multi-part handle portion 11. In a particular embodiment as is shown in FIG. 1G, the oblique sectional axis 16 additionally extends through the center 18 of the handle portion 11.

Figure 1H:
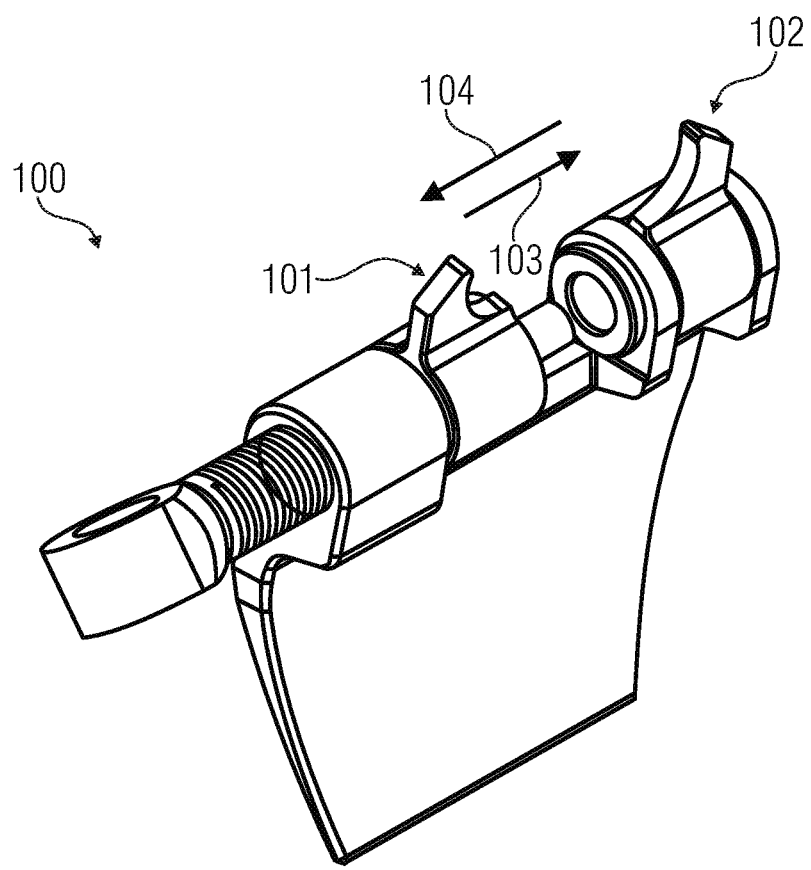
FIG. 1H shows a perspective view of an inventive tool function element.

FIG. 1H shows a perspective view of an inventive tool function element 100. The tool function element 100 is suited for actuating a quick release chain fastener 1000 shown in FIGS. 10, 11, 12.

The tool function element 100 comprises a first force exertion means 101 configured to exert a force on the first chain link plate connection means 1001B of the quick release chain fastener 1000.

The tool function element 100 comprises a second force exertion means 102 configured to exert a force on the second chain link plate connection means 1002B of the quick release chain fastener 1000.

The tool function element 100 is configured such that the first force exertion means 101 and the second force exertion means 102 can be translationally moved in relation to each other so as to actuate the quick release chain fastener 1000 by means of this translational movement.

In the embodiment depicted in FIG. 1H, the tool function element 100 is configured such that both force exertion means 101, 102 can be moved in an exclusively translational manner in relation to each other. In particular, the tool function element 100 is configured such that the first force exertion means 101 can be translationally moved in a first direction 103 and in an oppositely aligned second direction 104. Due to this translational movability of the first exertion means 101, the inventive translational relative movement between the first and the second force exertion means 101, 102 is provided. The translational relative movement may be a linear translational relative movement.

Figure 2A:
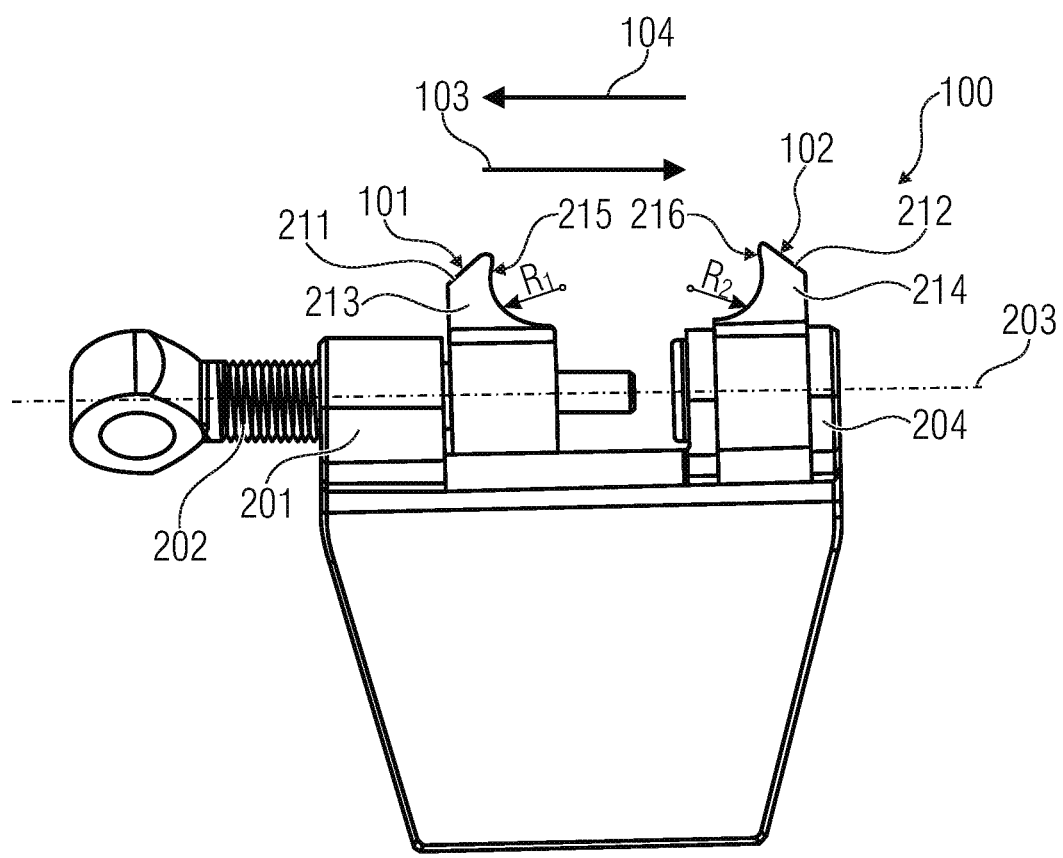
FIG. 2A shows a side view of a tool function element.

FIG. 2A shows a side view of an inventive tool function element 100. What can be seen is the first force exertion means 101 configured to exert a force on the first chain link plate connection means 1001B of the quick release chain fastener 1000. Moreover, the second force exertion means 102 can be seen which is configured to exert a force on the second chain link plate connection means 1002B of the quick release chain fastener 1000.

As was already mentioned above with reference to FIG. 1H, the first force exertion means 101 is translationally movable, so that the inventive translational relative movement between the first force exertion means 101 and the second force exertion means 102 is provided. The first force exertion means 101 may be movable at least in a first direction 103. The first force exertion means 101 may also be movable in a direction 104 opposite to the first direction 103.

Figure 3:
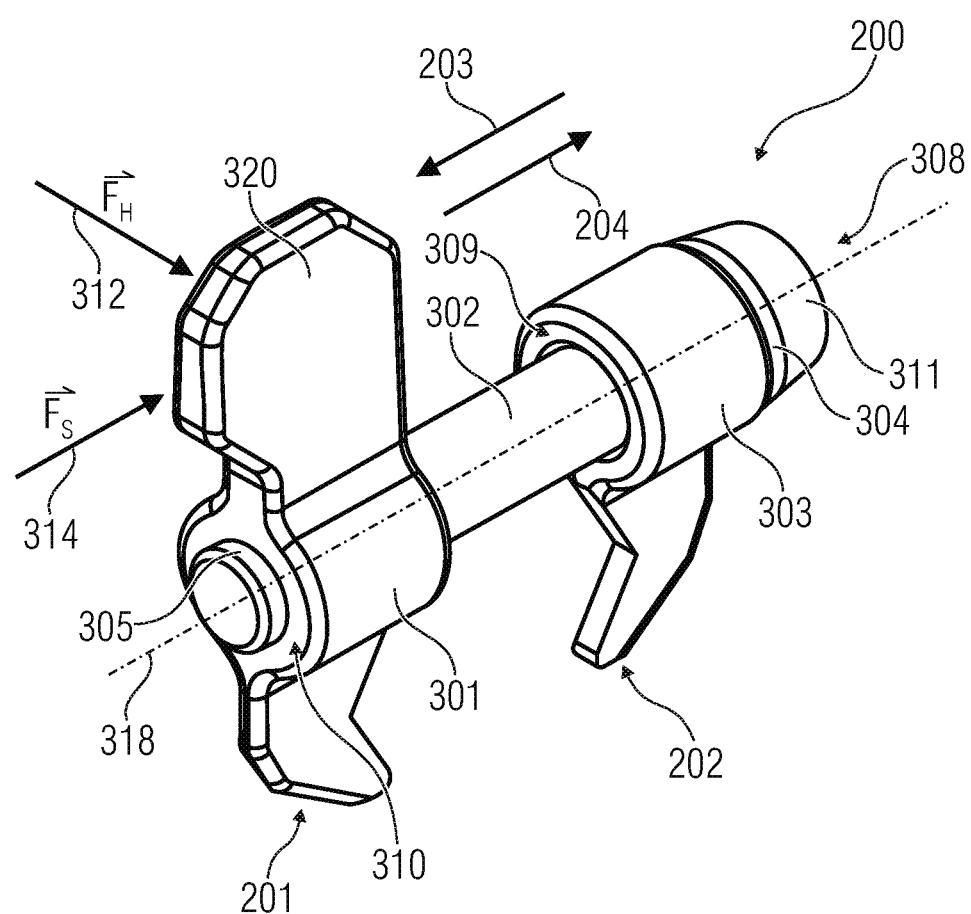
FIG. 3 shows a perspective view of an exemplary tool function element.
Figure 4:
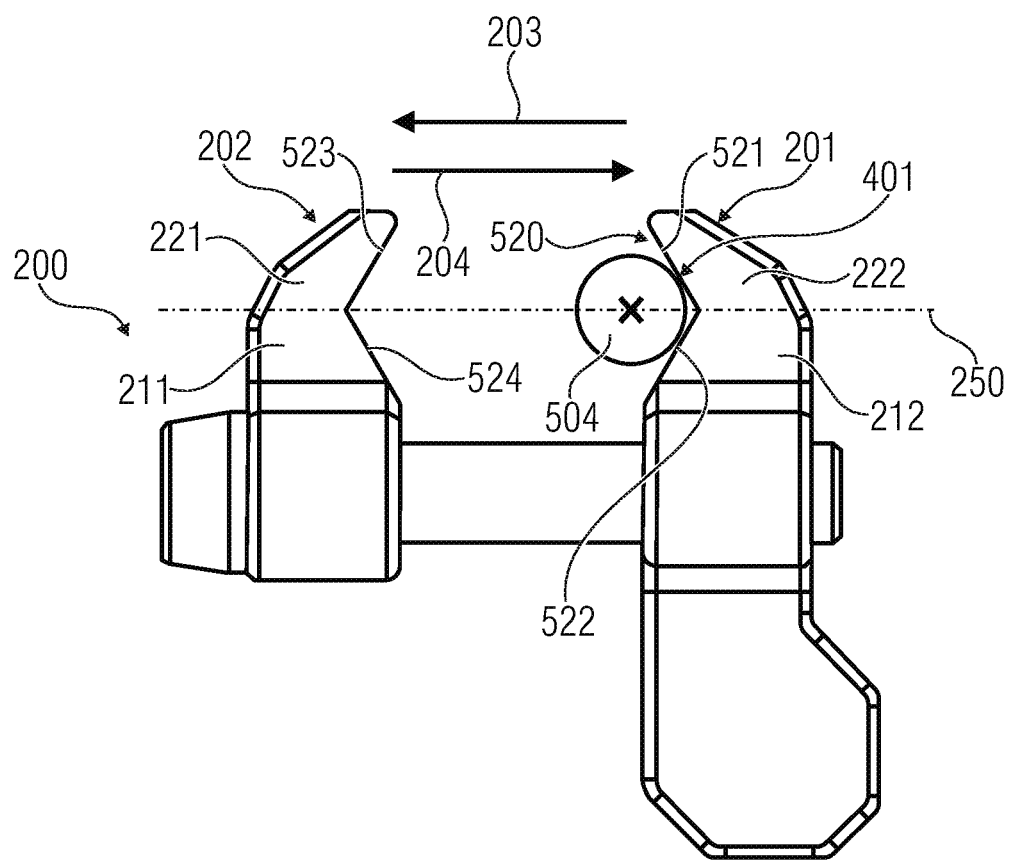
FIG. 4 shows a side view of the tool function element of FIG. 3.

FIGS. 3 and 4 show a further example of a tool function element 200. The tool function element 200 is suited to actuate a quick release chain fastener 1000 shown in FIGS. 10 to 12.

The tool function element 200 comprises a first force exertion means 201 configured to exert a force on the first chain link plate connection means 1001B of the quick release chain fastener 1000.

The tool function element 200 further comprises a second force exertion means 202 configured to exert a force on the second chain link plate connection means 1002B of the quick release chain fastener 1000.

The tool function element 200 is configured such that the first force exertion means 201 and the second force exertion means 202 can be translationally moved in relation to each other so as to actuate the quick release chain fastener 1000 by means of said translational movement. The translational relative movement may be a linear translational relative movement.

In accordance with this embodiment, the first force exertion means 201 can be moved in a first direction 203 and/or in a second direction 204 which is opposite to the first direction 203. In this embodiment it would also be feasible for the second force exertion means 202 to be movable in the first direction 203 and/or in the second direction 204 opposite to the first direction 203.

Figure 5:
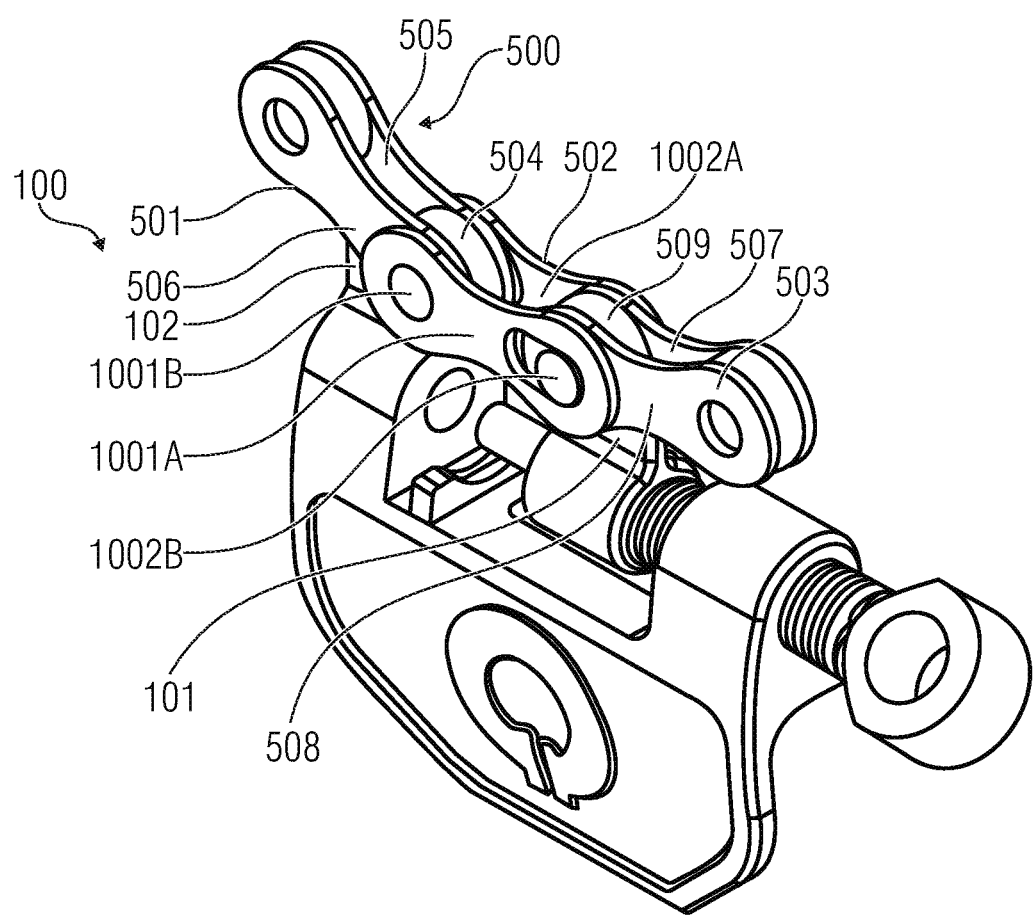
FIG. 5 shows a perspective view of a tool function element with a cutout of a chain locked with a quick release chain fastener.

FIG. 5 shows a further embodiment of an inventive tool function element 100 depicted along with a chain 500. For the sake of clarity, only a cutout of the chain 500 is depicted. Specifically, only three chain links 501, 502, 503 of a chain 500 which otherwise may comprise any number of chain links are shown.

Figure 10:
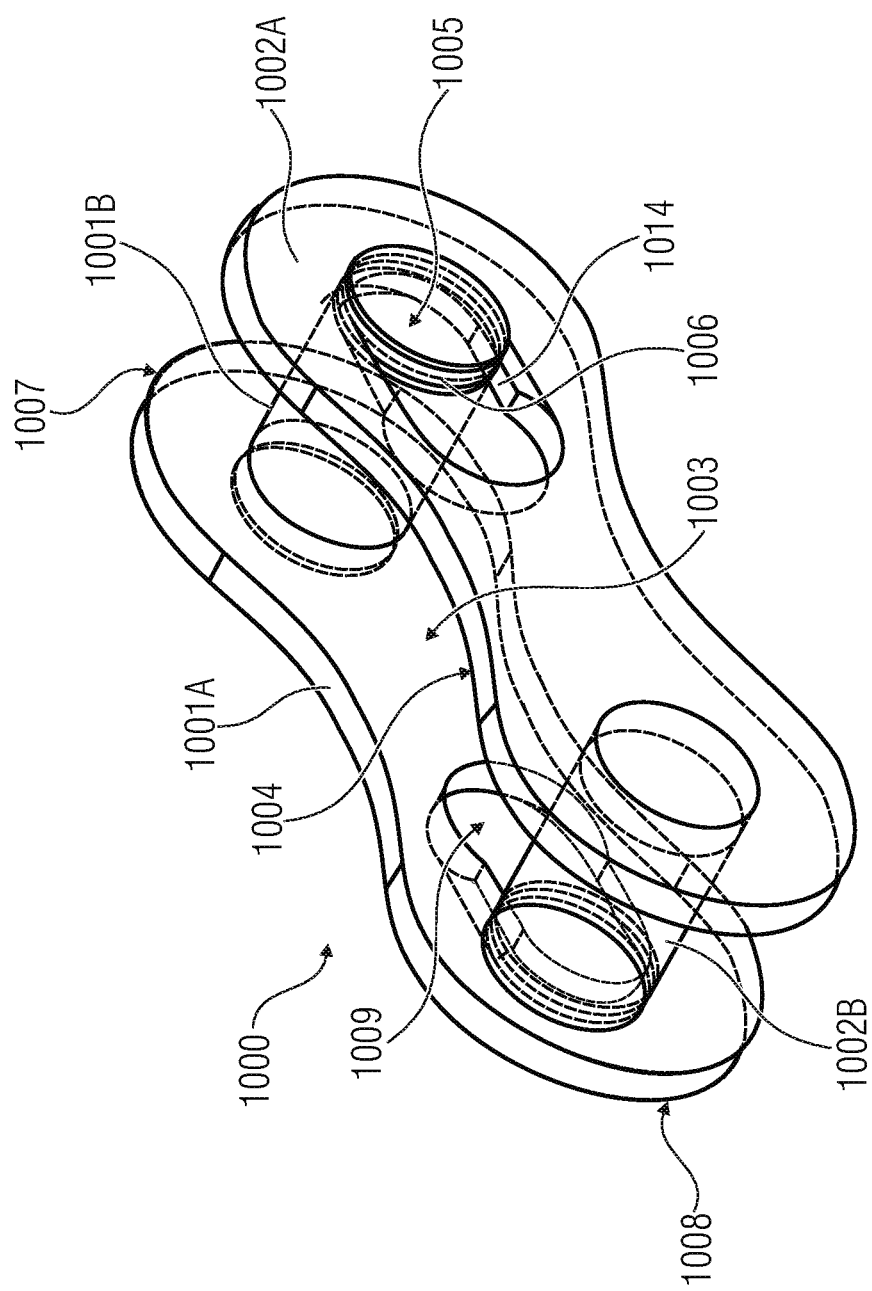
FIG. 10 shows a perspective view of a quick release chain fastener for a chain.
Figure 11:
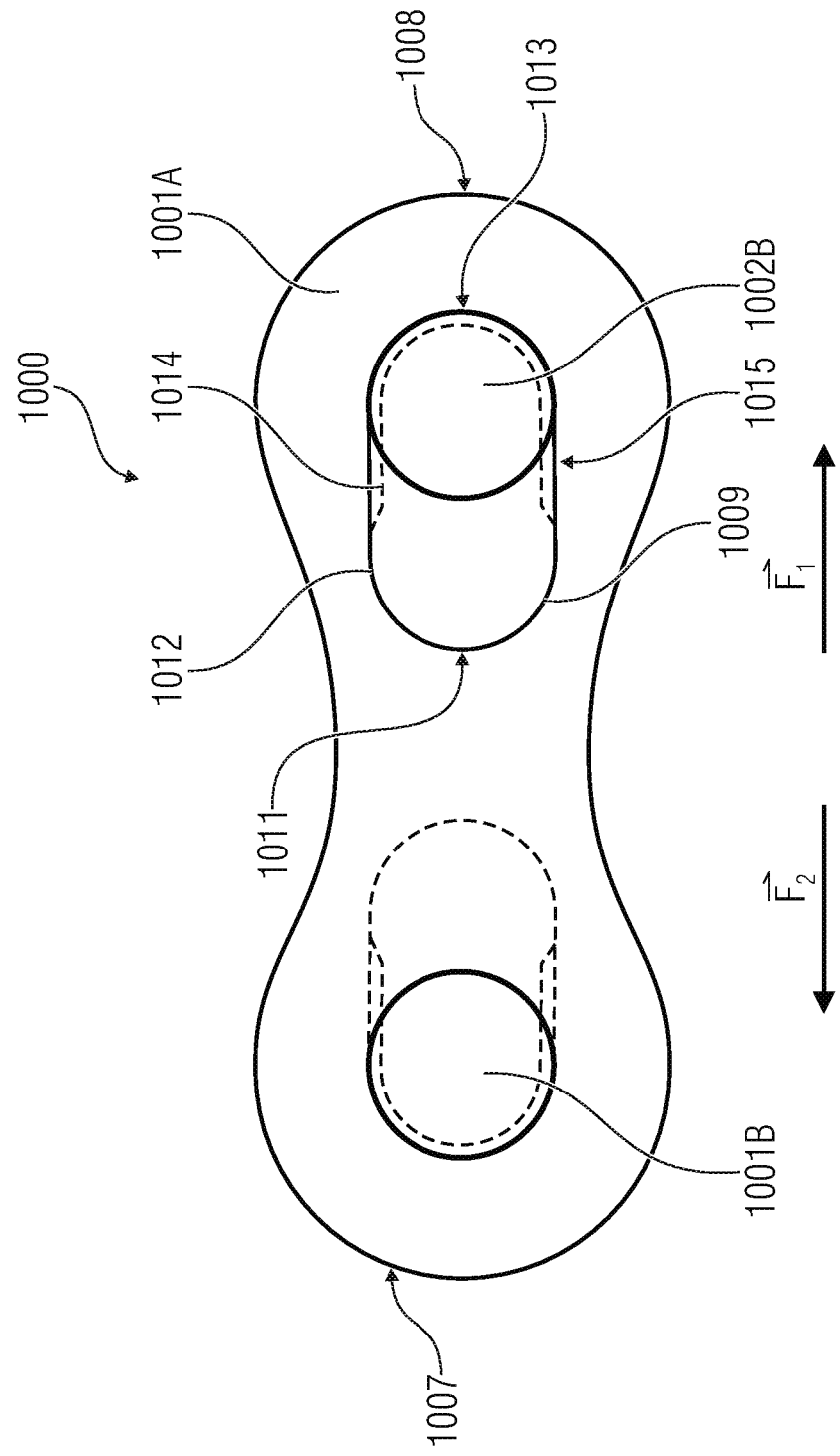
FIG. 11 shows a side view of a quick release chain fastener for a chain.
Figure 12:
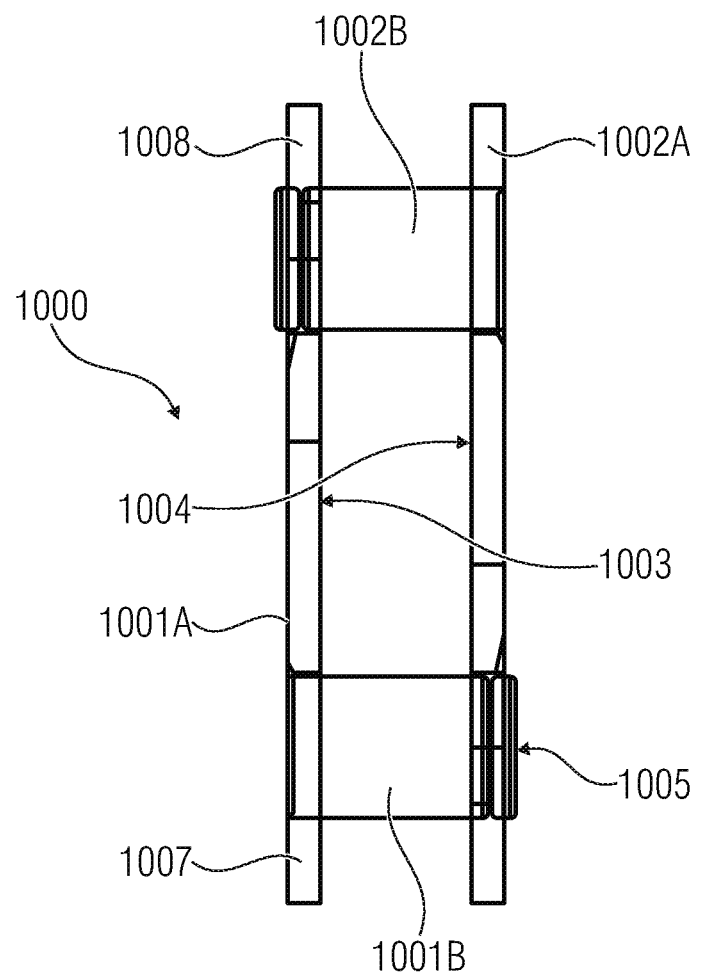
FIG. 12 shows a top view of a quick release chain fastener for a chain.

It can be seen that the two chain links 501, 503 are connected to and/or or locked by means of the quick release chain fastener 502 (which incidentally corresponds to the quick release chain fastener 1000 shown in FIGS. 10 to 12). The quick release chain fastener 502 is thus also a chain link of the chain 500.

The quick release chain fastener 502 comprises a first outer link plate 1001A and an oppositely arranged second outer link plate 1002A. The first outer link plate 1001A comprises a first chain link plate connection means 1001B extending in the direction toward the second outer link plate 1002A.

The first chain link 501 comprises a first inner link plate 505 and an oppositely arranged second inner link plate 506. A chain roller 504 is arranged between the two inner link plates 505, 506. The chain roller 504 comprises a continually extending opening (not shown here) in its center. In the state shown in FIG. 5, the first chain link plate connection means 1001B of the quick release chain fastener 502 is guided through this opening provided within the chain roller 504. Thus, the first chain link plate connection means 1001B of the quick release chain fastener 502 is surrounded by the chain roller 504.

The third chain link 503 comprises a first inner link plate 507 and an oppositely arranged second inner link plate 508. A chain roller 509 is arranged between the two inner link plates 507, 508. The chain roller 509 comprises a continually extending opening (not shown here) in its center. In the state shown in FIG. 5, the second chain link plate connection means 1002B of the quick release chain fastener 502 is guided through this opening provided within the chain roller 509. Thus, the second chain link plate connection means 1002B of the quick release chain fastener 502 is surrounded by the chain roller 509.

The two chain link plate connection means 1001B, 1002B of the quick release chain fastener 502 may be configured as rivets, bolts or connecting pins, for example.

Both force exertion means 101, 102 engage between the two inner link plates 505, 506; 507, 508 of that chain link 501, 503 which is directly adjacent in each case to the quick release chain fastener 502. In FIG. 5, the two force exertion means 101, 102 are therefore partly obscured by the depicted inner link plates 505, 506, 507, 508 of the first and third chain links 501, 503, respectively, and thus are only partly visible. However, it can be seen from FIG. 5 that the chain links 501, 502, 503 are arranged on the tool function element 100 such that both force exertion means 101, 102 are in contact, at least in sections, with the chain rollers 504, 509.

This is to be explained in more detail with reference to FIG. 2A. Here, both force exertion means 101, 102 are not obscured by a chain and can therefore be seen. The first force exertion means 101 comprises a first accommodating portion 211 for accommodating the quick release chain fastener 502. The second force exertion means 102 comprises a second accommodating portion 212 for accommodating the quick release chain fastener 502.

Figure 6:
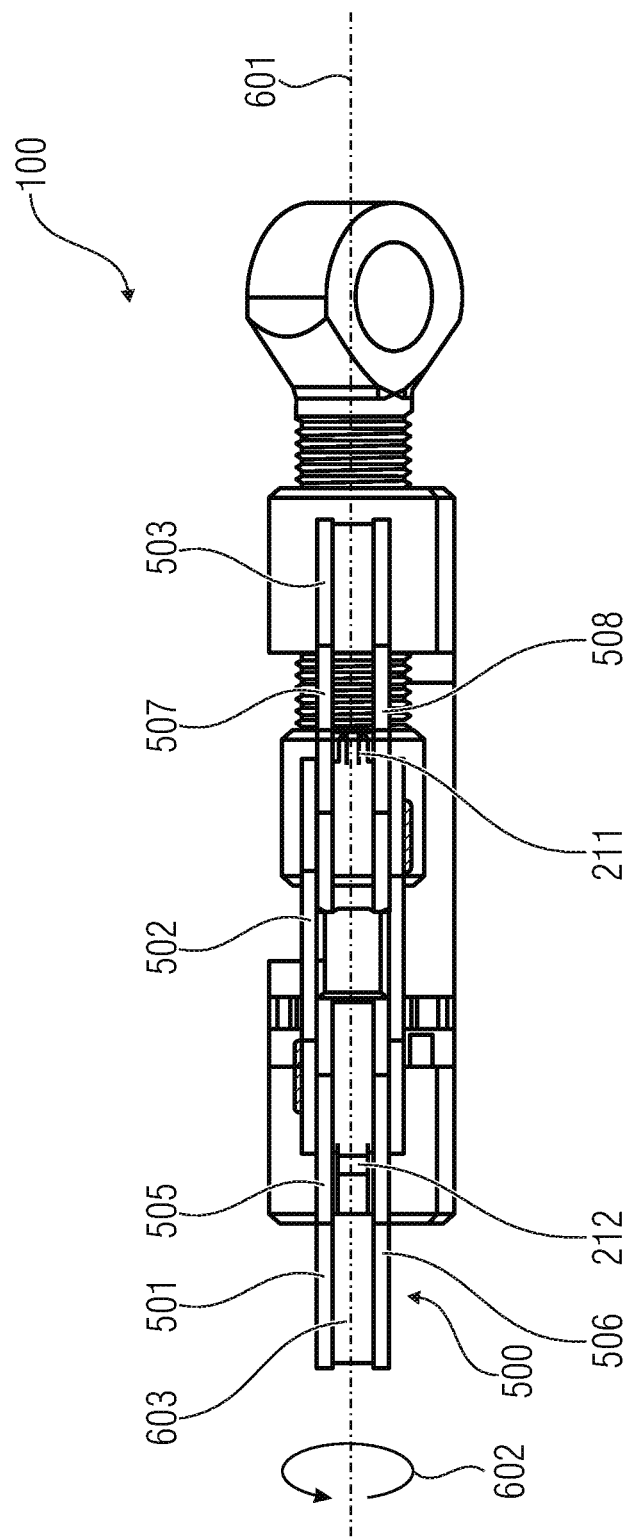
FIG. 6 shows a top view of a tool function element with a cutout of a chain locked with a quick release chain fastener.

The accommodating portions 211, 212 are configured to avoid tilting of the quick release chain fastener 502 along the longitudinal chain axis 601 (FIG. 6). To this end, brief reference shall be made to FIG. 6. FIG. 6 shows a top view of a tool function element 100 comprising a chain 500 arranged on the tool function element 100. The chain 500 is shown in cutouts and comprises first, second and third chain links 501, 502, 503.

The chain links 501, 502, 503 are arranged along the longitudinal chain axis 601. FIG. 6 also shows the above-mentioned accommodating portions 211, 212. The accommodating portions 211, 212 are configured to avoid tilting of the chain fastener 502 along the longitudinal chain axis 601. Such tilting is symbolically indicated by the arrow 602. Such tilting is a rotation about the longitudinal chain axis 601.

In order to further illustrate the embodiments of the accommodating portions 211, 212, reference shall be made again to FIG. 2A. Here, one can further see that the first accommodating portion 211 comprises a first engagement portion 213. The second accommodating portion 212 comprises a second engagement portion 214. The two engagement portions 213, 214 are configured to engage between two chain link plates 505, 506, 507, 508 (FIGS. 5 and 6) of a chain link 501, 503 adjacent to the quick release chain fastener 502 when the quick release chain fastener 502 is arranged within a chain 500.

As far as the engagement portions 213, 214 are concerned, one can again see, in the top view of FIG. 6, that their lateral extensions in the direction of the two opposite chain link plates 505, 506 of a chain link 501 roughly correspond to the width of the gap 603 formed between these two chain link plates 505, 506. In other words, the width of the engagement portions 213, 214 roughly corresponds to the clearance between two oppositely arranged chain link plates 505, 506. The first engagement portion 213 thus engages into the gap 603 of the first chain link 501 adjacent to the quick release chain fastener 502 with a more or less high accuracy of shape and fit. The same applies to the second engagement portion 214, which engages into the gap of the third chain link 503 adjacent to the quick release chain fastener 502 with a more or less high accuracy of shape and fit.

To further illustrate the embodiments of the accommodating portions 211, 212, reference shall again be made to FIG. 2A. Here, one can also see that the first accommodating portion 211 comprises a first contact portion 215 which can be brought into contact with a chain link plate connection means 1001B of a quick release chain fastener 502. The second accommodating portion 212 comprises a second contact portion 216 which can be brought into contact with the respectively other chain link plate connection means 1002B of the quick release chain fastener 502.

The first contact portion 215 comprises a radius $R_1$. The second contact portion 216 comprises a radius $R_2$. The radii $R_1$, $R_2$ essentially correspond to the radius of the respective chain link plate connection means 1001B, 1002B.

For example, the first radius $R_1$ essentially corresponds to the radius, or the outer circumference, of the chain roller 509, shown in FIG. 5, of the third chain link 503. The second radius $R_2$ essentially corresponds to the radius, or outer circumference, of the chain roller 504, shown in FIG. 5, of the first chain link 501. As was mentioned above, the chain rollers 504, 509 are also to be understood as being chain link plate connection means.

Due to the fact that the radii $R_1$, $R_2$ of the contact portions 215, 216 and of the chain rollers 504, 509 essentially match, the chain link plate connection means 504, 509 may positively come into contact with the contact portions 215, 216. Thus, the quick release chain fastener 502 may be positively accommodated and safely retained or seated by the accommodating portions 211, 212. Moreover, the force exertion means 101, 102 may thus advantageously exert those forces to the chain link plate connection means 1001B, 1002B; 504, 509 which are used for actuating the quick release chain fastener 502.

Figure 2B:
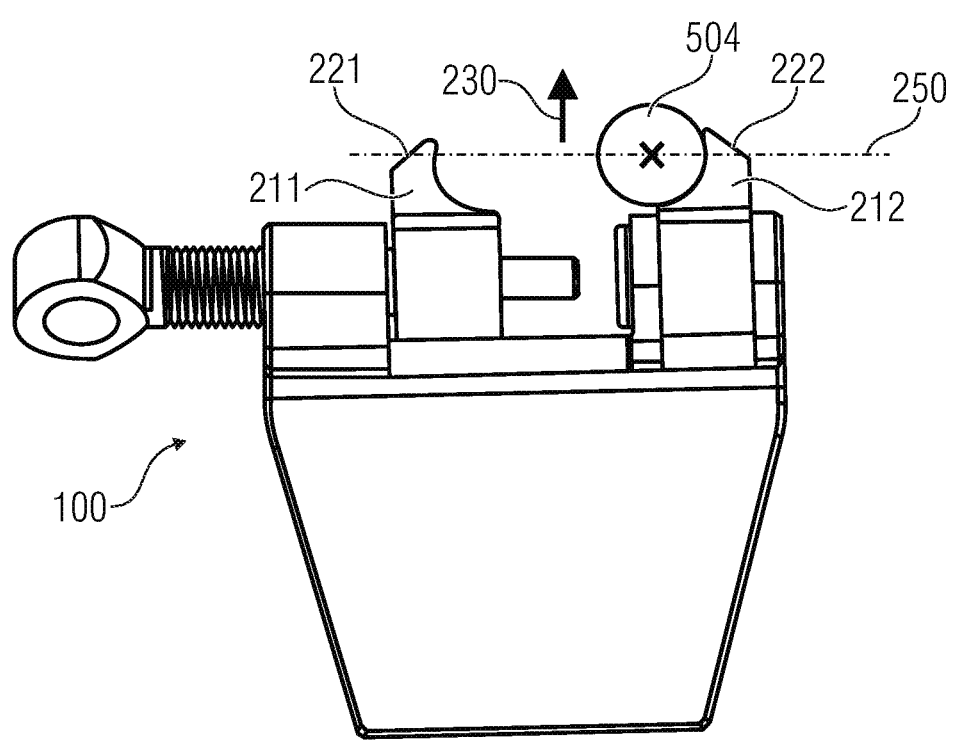
FIG. 2B shows a side view of the tool function element of FIG. 2A, comprising part of a stylized chain link plate connection means.

In order to further illustrate the embodiments of the accommodating portions 211, 212, reference shall now be made to FIG. 2B. Here, the tool function element 100 is shown in a side view, an exemplary chain link plate connection means being additionally drawn in here in the form of a chain roller 504 as compared to FIG. 2A.

The first accommodating portion 211 comprises a first retaining portion 221. The second accommodating portion 212 comprises a second retaining portion 222. The two retaining portions 221, 222 are configured to secure the quick release chain fastener 502 against tilting along the axis 240 extending in a manner that is transverse to the longitudinal chain axis 601 (FIG. 2C) or against a movement 230 directed out of the accommodating portion (FIG. 2D).

Figure 2C:
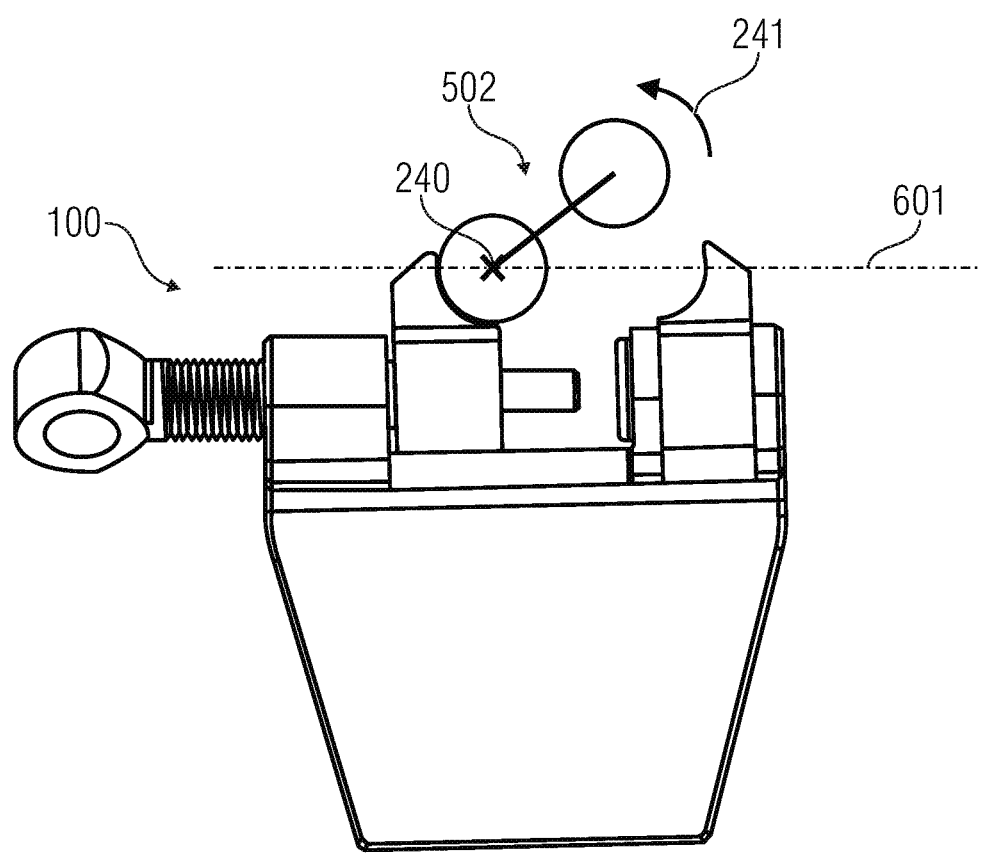
FIG. 2C shows a side view of the tool function element of FIG. 2A, comprising a stylized chain link plate connection means.

FIG. 2C shows a stylized quick release chain fastener 502. FIG. 2C shows the case of tilting along an axis 240 which extends in a manner that is transverse to the longitudinal chain axis 601. The axis 240 is directed into the sheet, or drawing, plane. Tilting of the quick release chain fastener 502 about this axis 240 is indicated by the symbolized arrow 241.

Figure 2D:
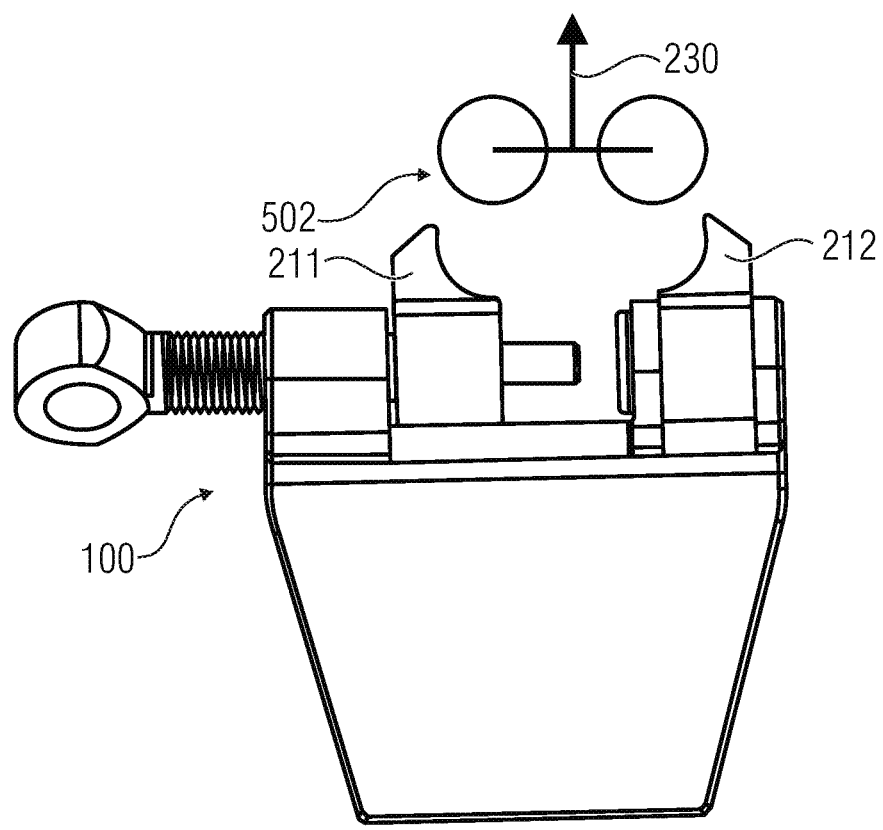
FIG. 2D shows a side view of the tool function element of FIG. 2A, comprising a stylized chain link plate connection means.

FIG. 2D shows the case of a movement 230 directed out of the accommodating portions 211, 212. The stylized quick release chain fastener 502 shown here moves out of the accommodating portions 211, 212, which is indicated by the symbolized arrow 230.

As was mentioned at the outset, the accommodating portions 211, 212 comprise a retaining portion 221, 222 configured to secure the quick release chain fastener 502 against these movements shown in FIGS. 2C and 2D. The retaining portions 221, 222 retain, as it were, the quick release chain fastener 502 within the tool function element 100.

One can also see in FIG. 2B that the retaining portions 221, 222 extend, at least in sections, beyond a center line 250 extending through the chain link plate connection means 504 in the longitudinal chain direction. That part of the retaining portion 222 that is arranged above the center line 250 is in contact, at least in sections, with that part of the chain link plate connection means 504 that is arranged above the center line 250.

This can also be seen in the embodiment shown in FIG. 4. Also here the accommodating portions 211, 212 comprise retaining portions 221, 222. The retaining portions 221, 222 extend, at least in sections, beyond a center line 250 extending through the chain link plate connection means 504 in the longitudinal chain direction.

That part of the retaining portion 222 that is arranged above the center line 250 here is not fully in contact, but is in contact in sections only, with that part of the chain link plate connection means 504 that is arranged above the center line 250. It is also possible for only one single contact point 401 to be provided between that part of the retaining section 222 that is arranged above the center line 250 and that part of the chain link plate connection means 504 that is arranged above the center line 250.

In the present embodiment, this is implemented, inter alia, in that a contact surface 520, of the retaining portion 222, which contacts the chain link plate connection means 504 is configured as a linearly extending portion 521. This linearly extending portion 521 extends tangentially along the circular shape of the chain roller 504 and touches same precisely at a point 401. In other words, the retaining portion 222 comprises a linearly extending portion 521 configured to contact the chain link plate connection means 504.

The accommodating portion 212 arranged below the retaining portion 222 also comprises a linearly extending portion 522 configured to contact the chain link plate connection means 504. The linear portion 522 which belongs to the accommodating portion 212 is configured roughly in the manner of a mirror image in relation to the linear portion 521 which belongs to the retaining portion 222, the center line 250 serving as the mirror axis.

The oppositely arranged second force exertion means 202 has a contour similar to that of the above-described first force exertion means 201. The retaining portion 221 of the second force exertion means 202 comprises a linearly extending portion 523 configured to contact the chain link plate connection means 504. That accommodating portion 211 of the second force exertion means 202 which is arranged below the retaining portion 221 also comprises a linearly extending portion 524 configured to contact the chain link plate connection means 504.

The linear portion 524 belonging to the accommodating portion 211 is configured roughly in the manner of a mirror image in relation to that linear portion 523 which belongs to the retaining portion 221, the center axis 250 serving as the mirror axis.

In other words, the first force exertion means 201 comprises a first, or upper, linearly extending portion 521 and a second, or lower, linearly extending portion 522. The second force exertion means 202 comprises a first, or upper, linearly extending portion 523 and a second, or lower, linearly extending portion 524. The two upper and lower linearly extending portions 521, 522, 523, 524 of the first and second force exertion means 201, 202 are configured such that they encompass the chain link plate connection means 504 at least in sections.

In the present embodiment, the linearly extending portions of the first force exertion means 201 and of the second force exertion means 202 are arranged to be located opposite one other. The oppositely arranged, linearly extending portions 521, 522, 523, 524 thus form a roughly prism-type shape. This prism-type shape may be configured such that known hexagonal screwheads can be accommodated.

Thus, the linearly extending portions 521, 522, 523, 524 form a negative shape that is complementary to hexagonal screwheads. The linearly extending portions 521, 522, 523, 524 are configured to encompass such a screwhead at least in sections. The screwhead can thus be clamped in between the first and second force exertion means 201, 202, similar to a wrench, and the screw may then be actuated by rotating the tool function element 200. Both in the tool function element 100 shown in FIG. 2B and in the tool function element 200 shown in FIG. 4, the retaining portions 221, 222 arranged above the center line 250 are mutually aligned. In other words, that part of the first retaining portion 221 that is arranged above the center line 250 extends toward the second retaining portion 222 in the longitudinal chain direction. That part of the second retaining portion 222 that is arranged above the center line 250 furthermore extends toward the first retaining portion 221 in the longitudinal chain direction.

Figure 7:
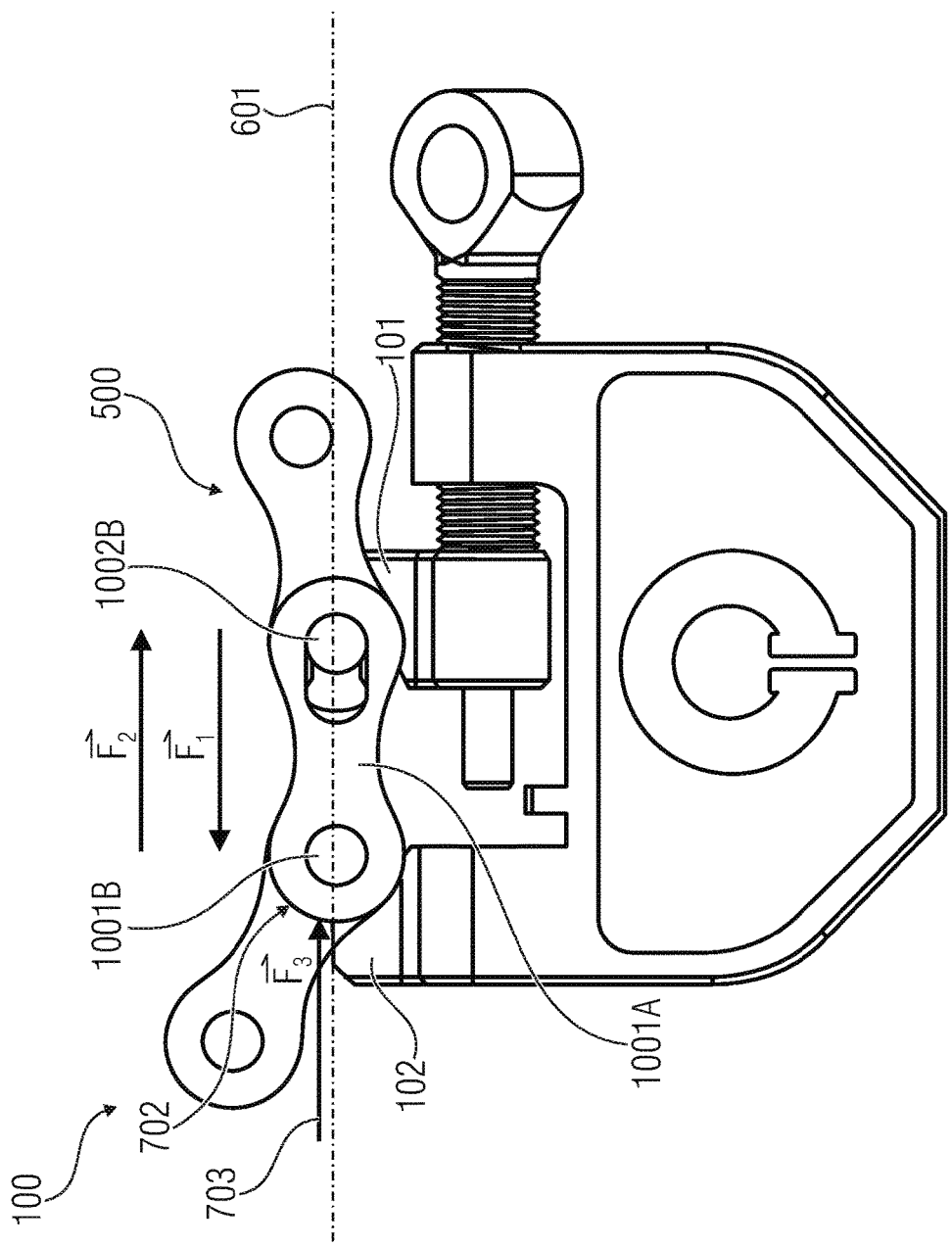
FIG. 7 shows a side view of a tool function element with a cutout of a chain locked with a quick release chain fastener.

FIG. 7 shows a further side view of a tool function element 100 on which a chain 500 is arranged. Also here the two force exertion means 101, 102 can be seen, again partly obscured by the chain links. At least the first force exertion means 101 is configured to exert a force $F_1$, $F_2$, which acts in the longitudinal chain direction, i.e. along the longitudinal chain axis 601, on the chain link plate connection means 1002B.

In the embodiment shown in FIG. 7, the oppositely arranged chain link plate connection means 1001B is supported on the second force exertion means 102. Accordingly, the second force exertion means 102 exerts a force on the chain link plate connection means 1001B, said force being directed oppositely, in terms of magnitude and direction, to the force exerted on the chain link plate connection means 1002B by the first force exertion means 101.

For example, in a translational relative movement of the two force exertion means 101, 102 toward each other, a force $F_1$ is exerted on the chain link plate connection means 1002B by the first force exertion means 101. At the same time, the second force exertion means 102 exerts a force $F_2$, which is equal in magnitude and opposite in direction, on the chain link plate connection means 1001B.

In the embodiment shown here, the two force exertion means 101, 102 exert the respective force $F_1$, $F_2$ directly on the respective chain link plate connection means 1001B, 1002B. As was already described above, inter alia with respect to FIG. 5, the chain rollers 504, 509 also are among the chain link plate connection means. Accordingly, in the context of the present invention a force directly exerted on the chain rollers 504, 509 is also to be understood as a force directly exerted on the chain link plate connection means 1001B, 1002B.

However, it is also feasible that at least one of the force exertion means 101, 102 exerts the force $F_1$, $F_2$ directly on a chain link plate connection means 1001B, 1002B via a chain link plate 1001A, 1002A of the quick release chain fastener 1000, 502.

For this purpose, for example in the embodiment shown in FIG. 7, the first force exertion means 101 might exert the force $F_1$ directly on the chain link plate connection means 1002B. The second force exertion means 102, in contrast, may come into contact, e.g., with the outside 702 of the chain link plate 1001A and may thus indirectly exert a force 703, designated by reference numeral $F_3$ here, on the chain link plate connection means 1001B, the force $F_3$ being equal in magnitude and opposed to force $F_1$.

Likewise, it is feasible for at least one of the force exertion means 101, 102 to indirectly exert the force $F_1$, $F_2$ on a chain link plate connection means 1001B, 1002B via a chain link 501, 503 adjacent to the quick release chain fastener 1000, 502 if the quick release chain fastener 1000, 502 is arranged within a chain 500. For this purpose, both force exertion means 101, 102 might be configured such that the forces $F_1$, $F_2$ act on the two chain links 501, 503 adjacent to the quick release chain fastener.

The tool function element 100, 200 of an inventive multifunctional tool 10 moreover comprises linear guide means. Such an embodiment is shown in FIG. 8A, for example.

The tool function element 100 here comprises linear guide means 801, 802. The linear guide means comprises a first linear guide element 801 and a second linear guide element 802. The first linear guide element 801 is translationally movable in relation to the second linear guide element 802. The first force exertion means 101, which here again is partly obscured by the chain 500, is arranged on the second linear guide element 802.

According to the invention, only one of the two force exertion means 101, 102 is arranged on the second linear guide element 802. Thus, the length of the second linear guide element 802 may be reduced as compared to known devices, and the entire multifunctional tool 10 may thus be configured to be more compact.

Figure 8A:
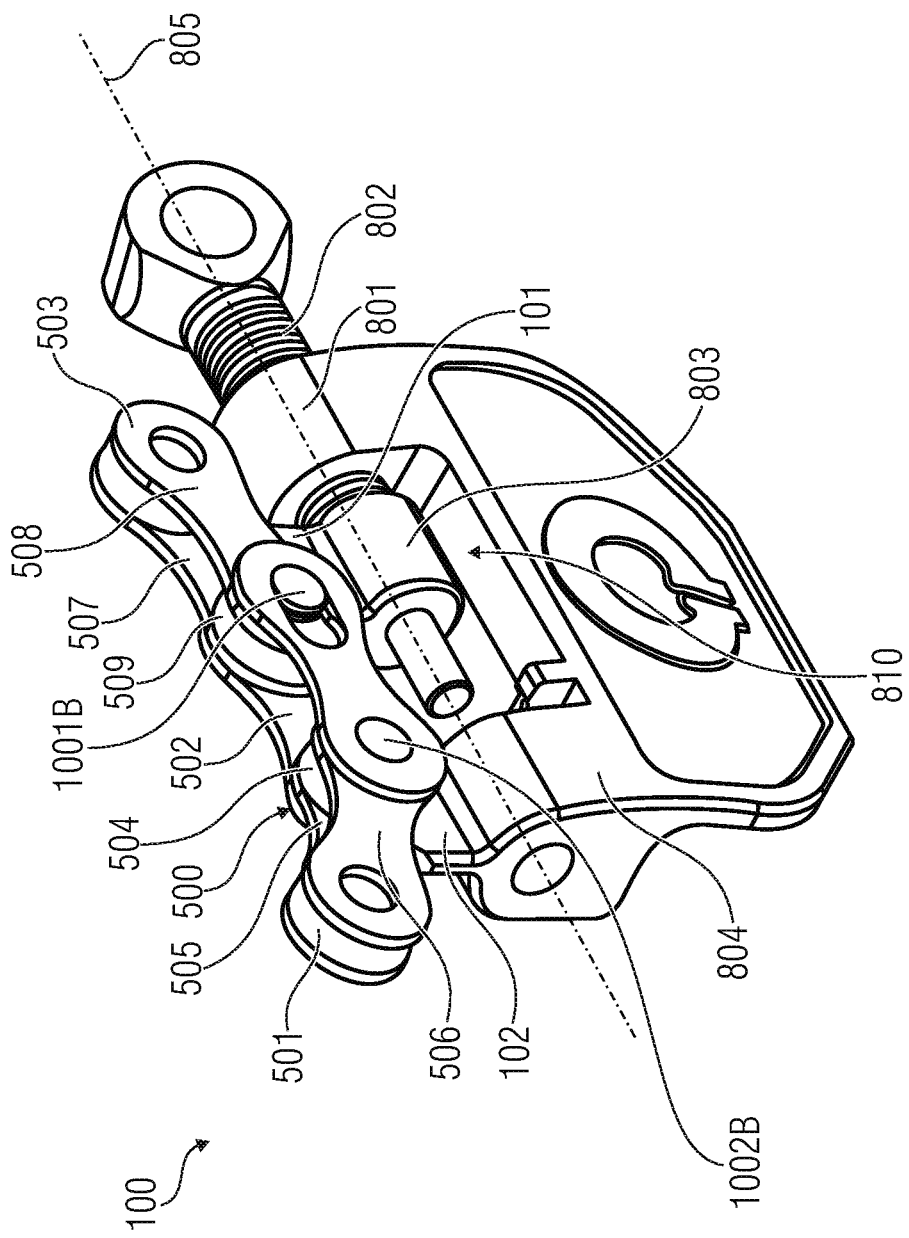
FIG. 8A shows a further perspective view of a tool function element with a cutout of a chain locked with a quick release chain fastener.

In the embodiment shown in FIG. 8A, the second linear guide element 802 is configured as a threaded bolt. The first linear guide element 801 is a bearing 801 configured in one piece with the tool function element 100. The bearing 801 comprises a bore through which the threaded bolt 802 is passed. The bore of the bearing 801 comprises an internal thread. The internal thread of the bearing 801 is complementary to the external thread of the threaded bolt 802 and is engaged therewith.

The first linear guide element 801 is stationary with regard to the tool function element 100, i.e., it does not move in relation to the tool function element 100. However, the second linear guide element 802 is movable with regard to the tool function element 100, i.e., it is movable in relation to the tool function element 100.

As a conceivable exemplary possibility of attaching the respective force exertion means 101, 102 to the second linear guide element 802, a bushing 803 may be arranged on a front-side first end 810 of the second linear guide element, or threaded bolt 802. The first force exertion means 101 is arranged at said bushing 803.

The threaded bolt 802 may comprise no thread in that area where the bushing 803 is arranged around the threaded bolt 802. However, it is also feasible for the threaded bolt 802 to comprise a thread also in this area surrounded by the bushing 803. The inner side of the bushing 803, which inner side faces the threaded bolt, comprises no thread. The bushing 803 and, thus, also the first force exertion means 101 arranged thereat, is mounted in a rotationally movable manner to the threaded bolt 802, i.e. the bolt 803 and/or the first force exertion means 101 rotates passively on the threaded bolt 802 upon rotation of the latter. Thus, the first force exertion means 101 may remain in the position shown in FIG. 8A upon rotation of the threaded bolt 802.

Upon rotation of the threaded bolt 802 about its longitudinally extending central axis 805, the threaded bolt 802 is supported at the bearing 801. The rotational movement is converted to a translational movement of the threaded bolt 802 by means of the threaded connection of the two linear guide elements, i.e. the threaded bolt 802 and the bearing 801. Accordingly, the first force exertion means 101 arranged at the threaded bolt 802 also moves along with the threaded bolt 802 and thus also performs a translational movement.

The respective force exertion means 101,102 is thus arranged on the second linear guide element 802 in a motion-coupled manner, so that the second linear guide element 802 and the force exertion means 101, 102 arranged thereon will together move in the same direction upon actuation.

For example, in a standard right-hand thread implementation, a clockwise rotation of the threaded bolt 802 results in a translational movement of the threaded bolt 802 and of the first force exertion means 101, said translational movement being directed toward the second force exertion means 102. The second linear guide element 802 and the force exertion means 101, 102 arranged thereon in a motion-coupled manner thus move together toward the respectively other force exertion means 101, 102. Both said force exertion means 101, 102 are therefore translationally moveable in relation to each other.

As was already mentioned, the second linear guide element 802 is moveable in a first direction 103 (FIG. 2A) so as to open the quick release chain fastener 502. Said first direction of movement 103 is a direction of movement of the two force exertion means 101, 102 toward each other. One can see in FIG. 8A that the force exertion means 101 arranged on the second linear guide element 802 is arranged in front of the first linear guide element 802 in this first direction of movement 103.

The tool function element 100 comprises a stationary bearing portion 804 having the respectively other one of the two force exertion means 101, 102 arranged or mounted thereon. In the embodiment shown in FIG. 8A, the second force exertion means 102 is arranged on the bearing portion 804, while the first force exertion means 101 is arranged on the second linear guide element 802 in a motion-coupled manner.

The bearing portion 804 is spaced apart from the first linear guide element 801. In addition, the bearing portion 804 is arranged opposite the first linear guide element 801 along the direction of movement 103 of the second linear guide element 802. According to the embodiment depicted, the first linear guide element 801 and the bearing portion 804 are furthermore configured in one piece.

This means that a free space having a clearance exists between the bearing portion 804 and the second linear guide element 802, so that the force exertion means 101, 102 arranged on the second linear guide element 802 may move to and fro within said free space, specifically by at least the dimension of the clearance.

The second linear guide element 802 comprises a threaded portion. As can be seen in FIG. 8A, this threaded portion extends through the first linear guide element 801 only but not through the stationary bearing portion 804.

As was mentioned above, the respectively other one of the two force exertion means 101, 102, i.e., that force exertion means 101, 102 which is not arranged on the second linear guide element 802, is arranged on the stationary bearing portion 804. The respective force exertion means 101, 102 may here be arranged on the bearing portion 804 in a translationally and/or rotationally movable or in a fixed manner.

In the embodiment shown in FIG. 8A, the second force exertion means 102 is configured in one piece with the bearing portion 804, i.e., that force exertion means 102 which is not arranged on the second linear guide element 802 is arranged on this bearing portion 804 in a translationally and rotationally fixed manner.

Figure 8B:
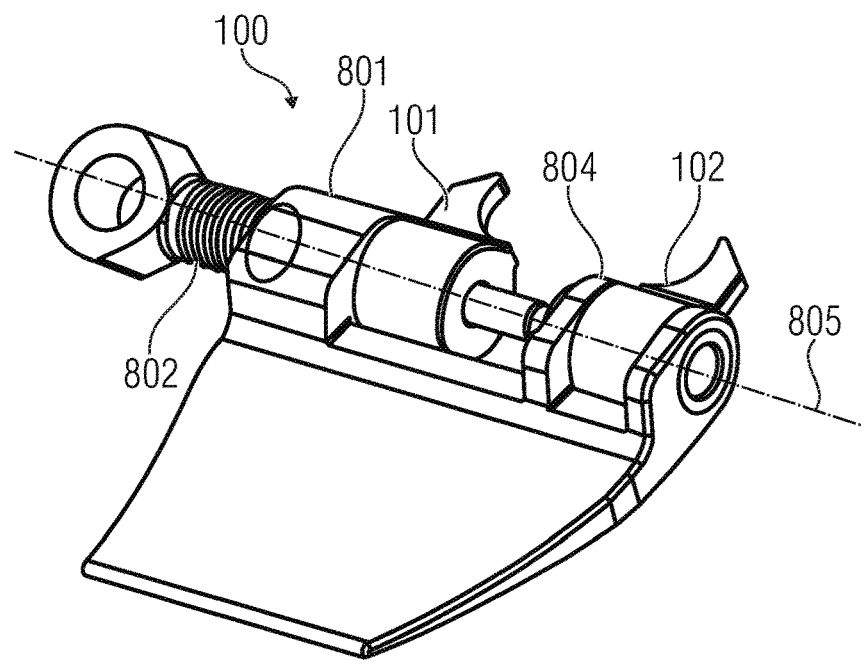
FIG. 8B shows a further perspective view of an inventive tool function element.

In an alternative embodiment shown in FIG. 8B, the tool function element 100 also comprises a stationary bearing portion 804; the force exertion means 102 which is not arranged on the second linear guide element 802 is arranged on said bearing portion 804 in a translationally fixed and rotationally movable manner.

Here, the tool function element 100 comprises a second bearing portion 804 also on that side which is opposite the first linear guide element 801. The second force exertion means 102 which is not arranged on the second linear guide element 802 is seated in this second bearing portion 804. The second force exertion means 102 here is seated in the bearing portion 804 in a translationally fixed manner. The second force exertion means 102 is seated within the bearing portion 804 in a rotationally moveable manner, however, i.e. the second force exertion means 102 can rotate, at least in sections, about the longitudinal axis 805.

Figure 8C:
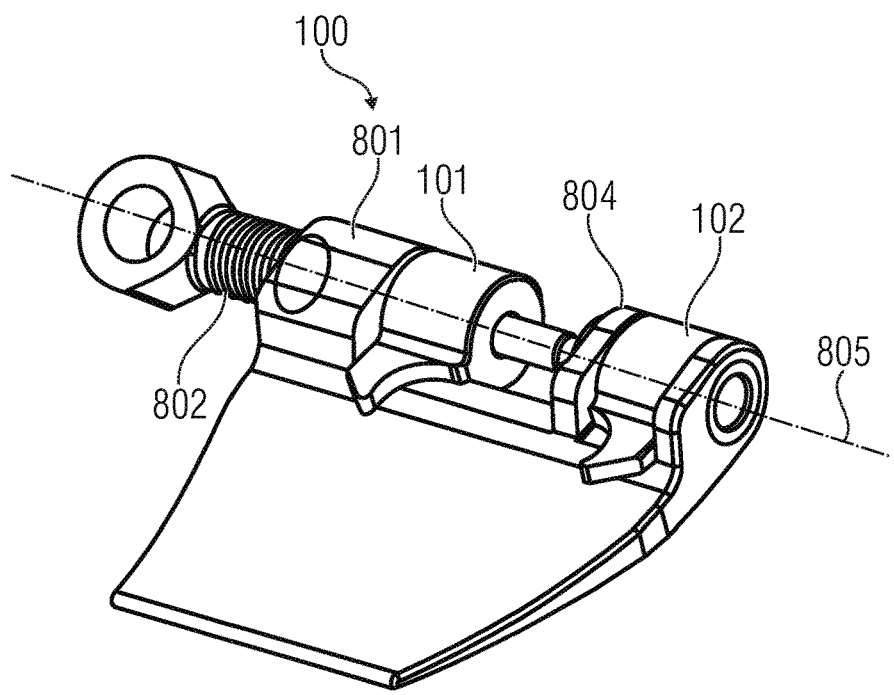
FIG. 8C shows a further perspective view of the tool function element of FIG. 8B.

Thus, FIG. 8C shows how both the first and the second force exertion means 101, 102 are rotated about the longitudinal axis 805 so as to fold in the two force exertion means 101, 102.

Figure 8D:
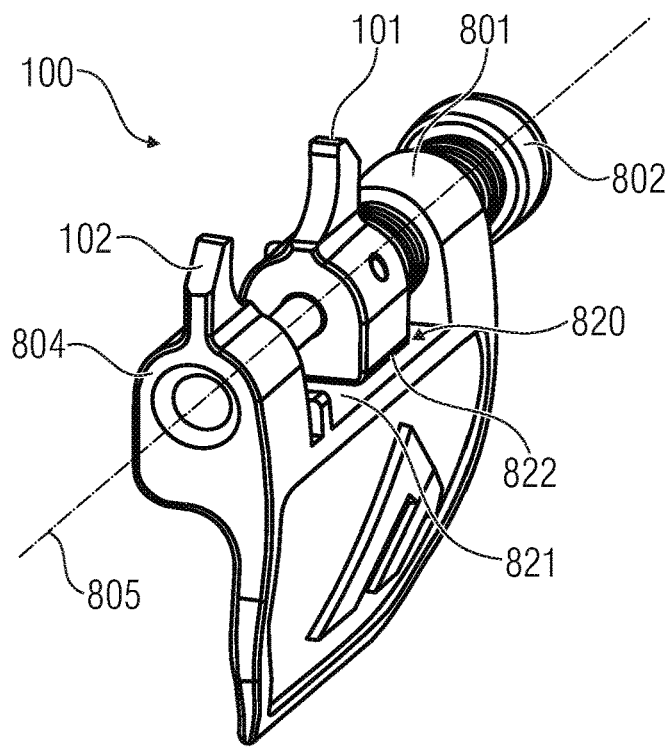
FIG. 8D shows a further perspective view of an inventive tool function element.

FIG. 8D shows a further embodiment of an inventive tool function element 100 for an inventive multifunctional tool 10. A guide portion 820 is configured between the stationary first linear guide element 801 and the oppositely arranged stationary bearing portion 804.

The guide portion 820 comprises a first running surface 821 which extends essentially along a plane extending in parallel with the directions of movement 103, 104 of the two force exertion means 101, 102. In other words, said plane extends in the longitudinal direction of the chain in case a chain for opening and/or closing is inserted into the tool function element 100.

The force exertion means 101 arranged on the second linear guide element 802 comprises, on its underside, i.e., on the side facing away from the chain, a second running surface 822 complementary to the first running surface 821. Upon a movement of the force exertion means 101 arranged on the second linear guide element 802, said force exertion means 101 will therefore slide, with its running surface 822, on the running surface 821 formed between the stationary bearing portion 804 and the stationary first linear guide element 801.

The force exertion means 101 arranged on the second linear guide element 802 thus is supported against rotation, i.e., against tilting, about the longitudinal axis 805 by means of the two running surfaces 821, 822.

Figure 8E:
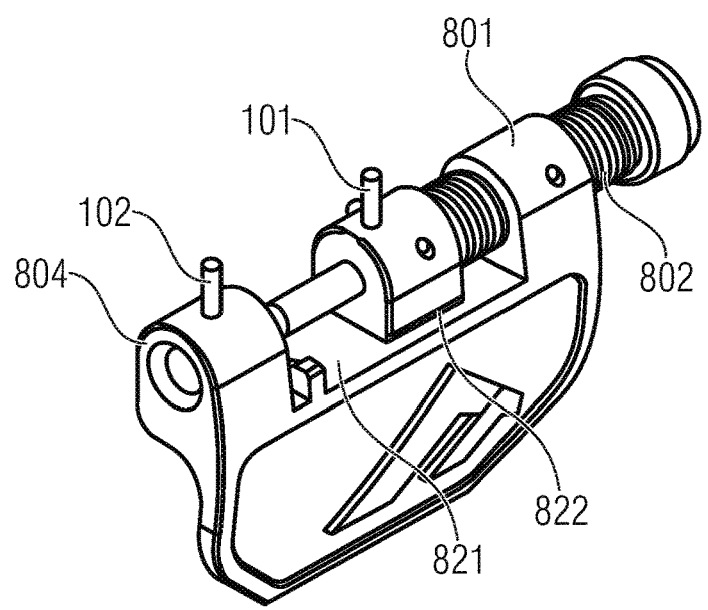
FIG. 8E shows a further perspective view of an inventive tool function element.

FIG. 8E shows a somewhat more oblique view of the tool function element 100 comprising the above-mentioned running surfaces 821, 822. In addition, the two force exertion means 101, 102 here are configured as pins only. Said pins 101, 102 offer a simple possibility of implementing a force exertion means.

Figure 8F:
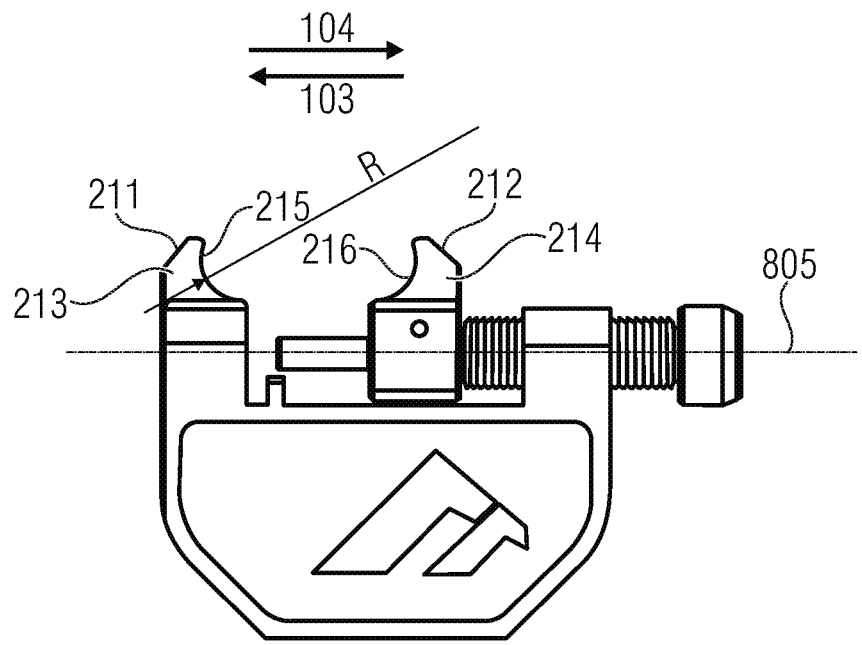
FIG. 8F shows a side view of an inventive tool function element.
Figure 8G:
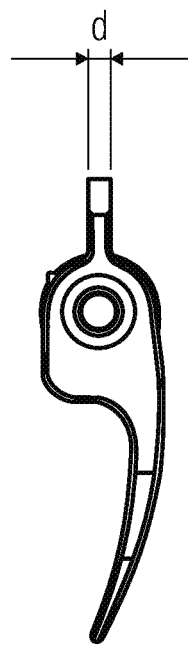
FIG. 8G shows a front view of the tool function element of FIG. 8F.

FIGS. 8F and 8G show further views of an inventive tool function element 100 for an inventive multifunctional tool 10. The accommodating portions 211, 212 and/or engagement portions 213, 214, which were mentioned above with reference to FIGS. 2A and 2B, have thicknesses d (FIG. 8G) from 1 mm to 2 mm, which are to be measured orthogonally to the linear movement direction 103, 104 and/or to the longitudinal axis 805. According to one embodiment, the thickness is 1.8 mm.

In addition, the contact portions 215, 216 comprise a radius R which is from 3.5 mm to 4.0 mm, advantageously from 3.7 mm to 3.9 mm, and more advantageously 3.8 mm.

A further example of a tool function element 100 comprising linear guide means is shown in FIG. 3.

Here, the tool function element 200 comprises linear guide means 301, 302, the linear guide means 301, 302 comprising a first linear guide element 301 and a second linear guide element 302. The first linear guide element 301 can be translationally moved in relation to the second linear guide element 302. The first force exertion means 201 is arranged at the first linear guide means 301.

The linear guide means 301, 302 further comprises a third linear guide element 303 at which the second force exertion means 202 is arranged.

In the embodiment shown in FIG. 3, the second linear guide element 302 is configured as a bolt. The first and third linear guide elements 301, 303 are configured as bushings which can slide on the bolt 302. In accordance with an embodiment, both bushings 301, 303 are slidingly arranged on the bolt 302. Thus, both bushings 301, 303 may be translationally moved both in a first direction 203 and in an opposite second direction 204.

On that side which is opposite the first force exertion means 201, the first bushing 301 further comprises an actuation element 320. A force 314 can be exerted on the actuation element 320, whereby the first bushing 301 moves in the direction 204 toward the second bushing 303 while sliding on the bolt 302. A force directed oppositely to the force 314 and exerted on the actuation element 320 accordingly causes the first bushing 301 to move away from the second bushing 303 in the direction 203 while sliding on the bolt 302.

Along with the bushings 301, 303, the force exertion means 201, 202 arranged at the bushings 301, 303 also move in relation to each other. Both bushings 301, 303 and both force exertion means 201, 202 move translationally along a shared translational axis 318.

Limiters or end stops may be provided for limiting the translational movements of the bushings 301, 303. For example, a disk 304 arranged on a first front side 308 of the bolt 302 limits the translational movement of the second bushing 303 in the second direction 204. For example, a circlip (not shown here), a cotter pin or the like may be arranged at an end portion 305 of the opposite front side of the bolt 302 so as to limit the translational movement of the first bushing 301 in the first direction 203.

In accordance with a further embodiment, the bolt 302 may comprise an external thread at least in sections. In accordance with this embodiment, the bolt 302 may be configured as a threaded bolt. The external thread may extend, for example, from the end portion 305 to roughly an opposite front side 309 of the second bushing 303. That portion of the bolt 302 which is surrounded by the second bushing 303 may thus be a portion having no external thread. The second bushing 303 can therefore be moved around the bolt 302 in an at least rotational manner. However, the second bushing 303 may also be rotationally movable around the bolt 302 if the bolt 302 comprises a thread at the portion surrounded by the second bushing 303. The second bushing 303 comprises no internal thread, which is why it is not in engagement with the external thread of the bolt 302. Upon rotation of the bolt 302, the second bushing 303 rotates passively, as it were. Due to its rotational movability because of its lacking internal thread, the second bushing 303 does not co-rotate with the bolt 302. Thus, upon rotation of the bolt 302, the second bushing 303 can remain at the position shown in FIG. 3.

In accordance with this embodiment the first bushing 301 in contrast comprises an internal thread configured at its continuous inner bore 310. The internal thread of the first bushing 301 engages with the external thread of the bolt 302. Upon rotation of the threaded bolt 302 about its central axis 318, the first bushing 301 is displaced, depending on the direction of rotation of the bolt 302, in the first or second directions 203, 204 on account of the above-mentioned threads being engaged with each other. Thus, the threaded connection converts the rotation of the bolt 302 to a translational movement of the first bushing 301.

The first bushing 301 and the first force exertion means 201 arranged thereat move translationally along a shared translational axis 318. Both bushings 301, 303 and both force exertion means 201, 202 thus move translationally in relation to each other along the shared translational axis 318.

In order to support the first bushing 301 against the rotational movement of the bolt 302, a retention force 312 opposite to the rotation may be exerted on the actuation element 320.

In order to perform the rotation of the bolt 302, the bolt 302 may comprise an actuation element 311 on its first front side 308. This may be a screwhead 311 having a known engagement structure such as Allen, Torx or the like.

In accordance with the above-described embodiments, therefore at least one of the two bushings 301, 303 may slide along the bolt 302, or at least one of the two bushings 301, 302 may comprise, along with the bolt 302, an engaging threaded connection. In both cases, the first force exertion means 101, 201 arranged at the first bushing 301 is translationally movable in relation to the second force exertion means 102, 202 arranged at the second bushing 302.

In order to mount the above-described tool function elements 100, 200 to an inventive multifunctional tool 10, the tool function elements 100, 200 may comprise mounting portions.

Figure 9:
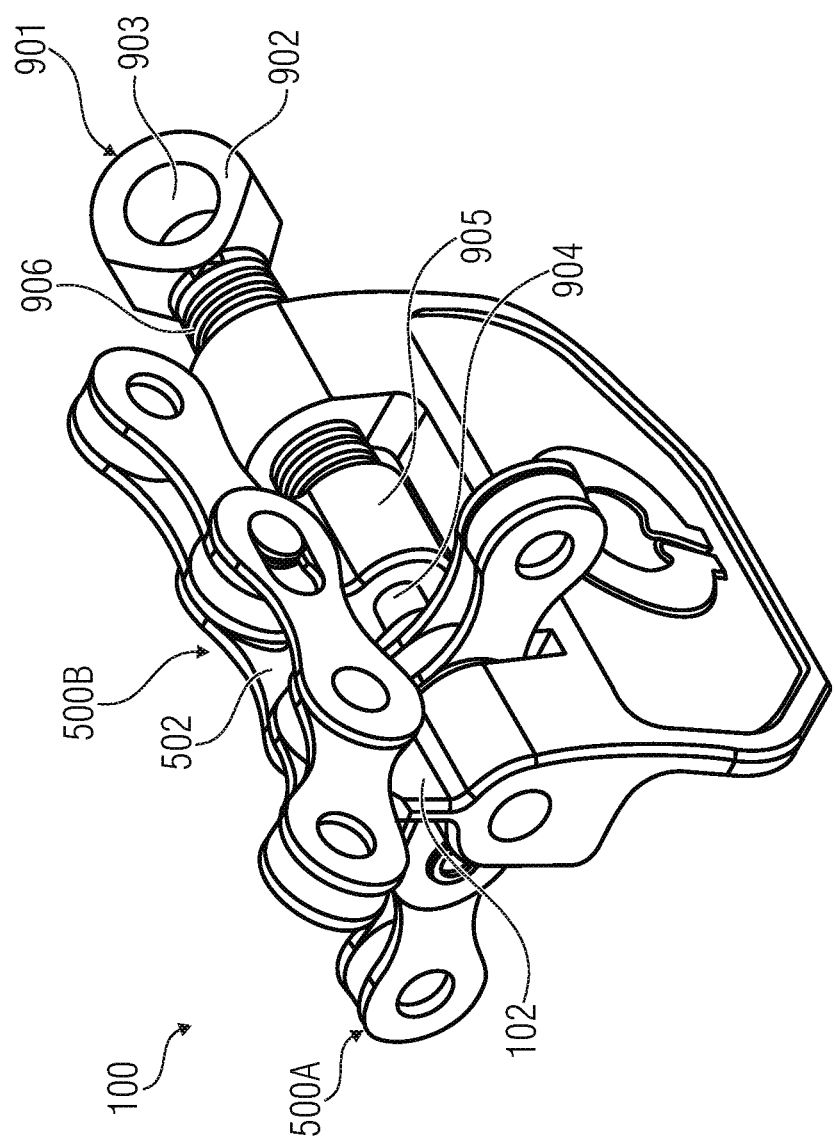
FIG. 9 shows a perspective view of a tool function element with a cutout of a chain locked with a quick release chain fastener, and with a cutout of a riveted chain.

As can be seen in FIG. 9, the tool function element 100 comprises a mounting portion 901. The mounting portion 901 is configured to mount the tool function element 100 to a multifunctional tool 10 (shown in FIGS. 1A to 1G). For this purpose, the mounting portion 901 may comprise, e.g., an eye 902 comprising an opening 903, the eye 902 being mountable to a pin, or bolt, 13 provided on the multifunctional tool 10. Further tool function elements, or bits, may be mounted to said pin, or bolt, 13.

The tool function element 100 may also comprise a rivet breaking pin 904. The rivet breaking pin 904 may be arranged at the bushing 905. The rivet breaking pin 904 may alternatively be provided at that front-side end of the threaded bolt 906 which faces the second force exertion means 102. In this case, the bushing 905 comprises a hole through which the rivet breaking pin 904 is passed.

With this tool function element 100 comprising the rivet breaking pin 904, a riveted chain 500A can be opened and/or riveted. With this tool function element 100, a quick release chain fastener 502, or a chain comprising a quick release chain fastener 502, may also be opened and/or closed, possibly at the same time.

Now that the structural features of the inventive device have been described, the mode of operation of the inventive multifunctional tool 10 comprising the tool function element 100, 200 shall be explained in more detail below with reference to FIGS. 1H, 2A and 8A to 8G. In the example shown in the figures, opening and/or closing of a chain 500 comprising a quick release chain fastener 502 is shown, only part of the chain 500 being depicted with three chain links 501, 502, 503. However, the inventive multifunctional tool 10 is also suited for opening and/or closing a quick release chain fastener 502, 1000 which need not necessarily be arranged within a chain.

In the example shown in FIG. 8A, a chain 500 locked with a quick release chain fastener 502 is shown. The quick release chain fastener 502, and thus the chain 500, is to be opened by means of the multifunctional tool 10, or the tool function element 100 arranged thereon. For this purpose, the chain 500 is initially inserted into the tool function element 100 as depicted in FIG. 8A.

To this end, the tool function element 100 comprises the accommodating portions 211, 212 shown in FIG. 2A. The chain 500 is placed upon the accommodating portions 211, 212 such that the two link plates 507, 508 of the third chain link 503 surround the first accommodating portion 211, whereas the two link plates 505, 506 of the first chain link 501 surround the second accommodating portion 212. Both chain links 501, 503 are thus accommodated by the accommodating portions 211, 212 and are secured by same against tilting along the longitudinal chain axis 203.

Both force exertion means 101, 102 may then be translationally moved toward each other and in relation to each other. To this end, the threaded bolt 202 is actuated. The threaded bolt 202 is rotated and, in this, is supported within the bearing 201 provided with a corresponding internal thread. The rotation of the threaded bolt 202 is thus converted to a translational movement of the threaded bolt 202. Thus, the first force exertion means 101 mounted on that front-side end of the threaded bolt 202 which faces the second force exertion means 102 is also translationally moved.

For example, in a standard right-hand thread, a clockwise rotation of the threaded bolt 202 is converted to a translational movement of the threaded bolt 202 that is directed toward the second force exertion means 102. Accordingly, the first force exertion means 101 arranged at the threaded bolt 202 also performs a translational movement toward the second force exertion means 102. This movement of the two force exertion means 101, 102 toward each other initially continues for such time until the contact portions 215, 216 come into contact with the chain rollers 504, 509.

The first contact portion 215 comes into contact with the chain roller 509 arranged between the quick release chain fastener 502 and the third chain link 503. The second contact portion 216 comes into contact with the chain roller 504 arranged between the quick release chain fastener 502 and the first chain link 501.

The contact portions 215, 216 comprise a radius which essentially corresponds to the radius of the chain rollers 504, 509. Consequently, the chain 500 may be accommodated by the tool function element 100 with a high accuracy of shape and fit.

The chain 500 now is located in that position at the tool function element 100 which is shown in FIG. 8A. The engagement portions 213, 214 are engaged with the respective chain link plate gap of the first and third chain links 501, 503, and the contact portions 215, 216 are in contact with the chain rollers 504, 509.

From this point in time onward, a force is exerted on the quick release chain fastener 502 by a further rotation of the threaded bolt 202 and, thus, by the continuing relative translational movement of the two force exertion elements 101, 102 toward each other. More specifically, the force exertion elements 101, 102 exert a force on the chain rollers 504, 509. In the chain 500 shown, the chain rollers 504, 509 are part of one chain link plate connection means, respectively.

In order to avoid tilting 241 (FIG. 2C) of the quick release chain fastener 502 along an axis 240 directed in a manner transverse to the longitudinal chain axis 203, those retaining portions 221, 222 which are arranged above the center line 250 (FIG. 2B), extending within the longitudinal chain axis 203, of the quick release chain fastener 502 encompass the chain rollers 504, 509.

The retaining portions 221, 222 furthermore serve to avoid that the quick release chain fastener 502 slides out in a direction directed out 230 of the tool function element 100 (FIG. 2D).

The retaining portions 221, 222 are advantageous in particular when the quick release chain fastener 502 is not arranged within a chain 500 and is to be opened and/or locked as stand-alone part. If the quick release chain fastener 502 is arranged within a chain 500, specifically, the engagement portions 213, 214 which are engaged with the adjacent chain links 501, 503 can already prevent the quick release chain fastener 502 from tilting 241 and/or sliding out 230.

Thus, the threaded bolt 202 keeps being rotated so that the first force exertion means 101 keeps translationally moving toward the second force exertion means 102. The first force exertion means 101 now exerts a force $F_1$ (FIG. 7) on the chain roller 509 arranged between the quick release chain fastener 502 and the third chain link 503. The second force exertion means 102 exerts a force $F_2$ (FIG. 7) on the chain roller 504 arranged between the quick release chain fastener 502 and the first chain link 501. Both forces $F_1$, $F_2$ are equal in magnitude and opposite in direction.

Both forces $F_1$, $F_2$ are directed such that both chain rollers 504, 509 are forced toward each other. Due to both said forces $F_1$, $F_2$ being exerted on the two chain rollers 504, 509, the chain rollers 504, 509 are thus moved toward each other. More specifically, both bolts 1001B, 1002B of the quick release chain fastener 502 slide toward each other within the elongated holes of the respectively opposite link plate of the quick release chain fastener 502.

The threaded bolt 202 keeps being actuated for such time until, due to the translational relative movement of both force exertion means 101, 102 toward each other, both bolts 1001B, 1002B of the quick release chain fastener 502 arrive in that area provided within the respective elongated hole which has an enlarged diameter. As soon as the bolts 1001B, 1002B have arrived in this area having an enlarged diameter, both chain link plates of the quick release chain fastener 502 may be laterally moved away from each other. The quick release chain fastener 502 is then opened.

The tool function element 100 may also be used for locking the quick release chain fastener 502. Therefore, it would be useful to introduce both force exertion means 101, 102 into the chain link plate gap of the quick release chain fastener 502 so that the first force exertion means 101 comes into contact, on the inside, with the chain roller 509 and so that the second force exertion means 102 comes into contact, on the inside, with the chain roller 504.

More specifically, both the chain roller 509 arranged between the quick release chain fastener 502 and the third chain link 503 and the chain roller 504 arranged between the quick release chain fastener 502 and the first chain link 501 each comprise a side which faces the chain link plate gap. Said sides are also located opposite each other. The first force exertion means 101 comes into contact with that side of the chain roller 509, said chain roller 509 being arranged between the quick release chain fastener 502 and the third chain link 503, which faces the chain link plate gap. The second force exertion means 102 comes into contact with that side of the chain roller 504, said chain roller 504 being arranged between the quick release chain fastener 502 and the first chain link 501, which faces the chain link plate gap.

The tool function element 100 now can be actuated in that the threaded bolt 202 is rotated in the direction opposed to the above-described direction. In a standard right-hand thread, the threaded bolt 202, 802 thus is rotated in a counter-clockwise direction. This in turn results in a relative translational movement of the two force exertion elements 101, 102, said relative translational movement now being directed such that the two force exertion elements 101, 102 move away from each other.

The force exertion means 101, 102 in turn exert a force $F_1$, $F_2$ on the respective chain rollers 504, 509. Both chain rollers 504, 509 thus also move away from each other. The bolts 1001B, 1002B of the quick release chain fastener 502 slide along the portion with a reduced diameter which is provided within the respective elongated holes until they reach the stop thereof. Thus, the quick release chain fastener 502 is closed.

As can be seen in FIG. 11, in particular, those portions 1014, provided within the elongated holes 1011, which have a reduced diameter have a straight-line, or linear, portion 1015. Within this linear portion 1015, the bolts 1001B, 1002B also slide in a straight-line, or linear, manner. A linear translational movement performed with the tool function element 100, 200 is therefore well suited for actuating, i.e. for opening and/or closing, a quick release chain fastener 502, 1000. When chain pliers are used, in contrast, a force component which does not correspond to the linear direction of the elongated holes is exerted on the bolts because of the relative rotational movement of the two halves of the chain pliers toward each other. In other words, with regard to FIG. 11 this means that the horizontal forces $F_1$, $F_2$ will have a vertical force component (not shown here) added thereto when chain pliers are used.

Subsequently, further feasible embodiments, in particular embodiments of a tool function element 100, 200 which is combinable with the inventive multifunctional tool 10 shall be disclosed, said tool function element 100, 200 subsequently synonymously also being referred to merely as a device 100, 200:

1. Device (100, 200) for actuating a quick release chain fastener (502, 1000) comprising two chain link plates (1001A, 1002A) and two chain link plate connection means (1001B, 1002B), the quick release chain fastener (502, 1000) being actuatable in that the chain link plate connection means (1001B, 1002B) are moved in relation to one another, the device (100, 200) comprising:
   first force exertion means (101, 201) configured to exert a force ($F_1$, $F_2$) on the first chain link plate connection means (1001B) of the quick release chain fastener (502, 1000),
   second force exertion means (102, 202) configured to exert a force ($F_1$, $F_2$) on the second chain link plate connection means (1002B) of the quick release chain fastener (502, 1000),
   wherein
   the first force exertion means (101, 201) and the second force exertion means (102, 202) are translationally moveable in relation to each other so as to actuate the quick release chain fastener (502, 1000) by means of this translational movement.

2. Device of embodiment 1, the device (100, 200) being configured such that both force exertion means (101, 102; 201, 202) are moveable in relation to each other in an exclusively translational manner.

3. Device of embodiments 1 or 2, wherein at least one of the force exertion means (101, 102; 201, 202), is configured to exert a force ($F_1$, $F_2$), which acts in the longitudinal chain direction (601), on the respective chain link plate connections means (1001B, 1002B).

4. Device of any of the previous embodiments, wherein at least one of the two force exertion means (101, 102; 201, 202) is configured such that the force ($F_1$) exerted on the first chain link plate connection means (1001B) and the force ($F_2$) exerted on the second chain link plate connection means (1002B) are oppositely directed.

5. Device of any of the previous embodiments, wherein at least one of the two force exertion means (101, 102; 201, 202) exerts the force ($F_1$, $F_2$) directly on the respective chain link plate connection means (1001B, 1002B; 504, 509).

6. Device of any of the previous embodiments, wherein at least one of the two force exertion means (101, 102; 201, 202) exerts the force ($F_1$, $F_2$) on a chain link plate connection means (1001B, 1002B; 504, 509) indirectly via the chain link plate (1001A, 1002A) of the quick release chain fastener (502,1000) or via a chain link (501, 503) adjacent to the quick release chain fastener (502, 1000) when the quick release chain fastener (502,1000) is arranged within a chain (500).

7. Device of any of the previous embodiments, wherein at least one of the two force exertion means (101, 102; 201, 202) comprises an accommodating portion (211, 212) for accommodating the quick release chain fastener (502, 1000), said accommodating portion (211, 212) being configured to avoid tilting (602) of the quick release chain fastener (502, 1000) along the longitudinal chain axis (601).

8. Device of embodiment 7, wherein the accommodating portion (211, 212) comprises an engagement portion (213, 214) configured to engage between two chain link plates (505, 506; 507, 508) of a chain link (501, 503) adjacent to the quick release chain fastener (502, 1000) when the quick release chain fastener (502, 1000) is arranged within a chain (500).

9. Device of embodiment 7 or 8, wherein the accommodating portion (211, 212) comprises a contact portion (215, 216) which can be brought into contact with a chain link plate connection means (1001B, 1002B; 504, 509) of a quick release chain fastener (502, 1000), said contact portion (215, 216) comprising a radius ($R_1$, $R_2$) essentially corresponding to the radius of the chain link plate connection means (1001B, 1002B; 504, 509).
10. Device of any of embodiments 7 to 9, wherein the accommodating portion (211, 212) comprises a retaining portion (221, 222) configured to secure the quick release chain fastener (502, 1000) against tilting (241) along an axis (240) extending in a manner that is transverse to the longitudinal chain axis (601) or against a movement (230) directed out of the accommodating portion (211, 212).
11. Device of embodiment 10, wherein the retaining portion (211, 212) extends, at least in sections, beyond a center line (250) extending through the chain link plate connection means (1001B, 1002B; 504, 509) in the longitudinal chain direction, and wherein the retaining portion (211, 212) is in contact, at least in sections, with a portion, arranged above the center line (250), of the chain link plate connection means (1001B, 1002B; 504, 509).
12. Device of any of the previous embodiments, the device comprising a linear guide means (301, 302; 801, 802), wherein the linear guide means (301, 302; 801, 802) comprises a first linear guide element (301; 801) and a second linear guide element (302; 802) and wherein the first linear guide element (301; 801) is translationally moveable in relation to the second linear guide element (302; 802), and wherein at least one of the two force exertions means (101, 102; 201, 202) is arranged at one of the first and second linear guide elements (301, 302; 801, 802).
13. Device of embodiment 12, wherein the at least one of the two force exertion means (101, 102; 201, 202) is arranged at one of the first and second linear guide elements (301, 302; 801, 802) in a rotationally and/or translationally moveable manner.
14. Device of any of embodiments 11 to 13, the device comprising a bearing (204, 804), wherein the force exertion means (101, 102; 201, 202) that is not arranged at any of the two linear guide elements (301, 302; 801, 802) is mounted to said bearing (204, 804) in a translationally fixed manner.
15. Device of any of embodiments 11 to 14, wherein the first linear guide element (301) comprises an internal thread and the second linear guide element (302) comprises an external thread engaged with said internal thread, wherein one of the two force exertion means (201, 202) is arranged at the first linear guide element (301) and the translational relative movement of the two force exertion means (201, 202) in relation to each other is provided by rotation of the mutually engaged threads of the two linear guide elements (301, 302).
16. Device of any of embodiments 11 to 14, wherein the first linear guide element (801) comprises an internal thread and the second linear guide element (802) comprises an external thread engaged with said internal thread, wherein one of the two force exertion means (101, 102) is arranged at the second linear guide element (802) and the translational relative movement of the two force exertion means (101, 102) in relation to each other is provided by rotation of the mutually engaged threads of the two linear guide elements (801, 802).
17. Device of any of the previous embodiments, wherein one of the two force exertion means (101, 102; 201, 202) is configured in one piece with the device.
18. Device of any of the previous embodiments, wherein both force exertion means (101, 102; 201, 202) are translationally moveable in relation to each other along a shared translational axis (318, 805).
19. Device of any of the previous embodiments, the device comprising a mounting portion (901) configured to mount the device to a multifunctional tool.
20. Multifunctional tool comprising a device (100, 200) of any of the previous embodiments.
21. Method of manufacturing a device (100, 200) for actuating a quick release chain fastener (502, 1000) comprising two chain link plates (1001A, 1002A) and two chain link plate connection means (1001B, 1002B), the method comprising:
providing first force exertion means (101, 102; 201, 202) configured to exert a force ($F_1$, $F_2$) on the first chain link plate connection means (1001B) of the quick release chain fastener (502, 1000),
providing second force exertion means (101, 102; 201, 202) configured to exert a force ($F_1$, $F_2$) on the second chain link plate connection means (1002B) of the quick release chain fastener (502, 1000), and
arranging the two force exertion means (101, 102; 201, 202) with respect to each other such that the two force exertion means (101, 102; 201, 202) are, at least in sections, opposed to each other and are translationally moveable in relation to each other so as to actuate the quick release chain fastener (502, 1000) by means of this translational movement.
22. Method of actuating a quick release chain fastener (502, 1000) comprising two chain link plates (1001A, 1002A) and two chain link plate connection means (1001B, 1002B) by means of a device (100, 200) for actuating a quick release chain fastener (502, 1000), comprising:
exerting a first force ($F_1$, $F_2$) on the first chain link plate connection means (1001B) by means of first force exertion means (101, 102; 201, 202),
exerting a second force ($F_1$, $F_2$) on the second chain link plate connection means (1002B) by means of second force exertion means (101, 102; 201, 202),
actuating the device (100, 200) such that the first force exertion means (101; 201) and the second force exertion means (102; 202) translationally move in relation to each other so as to exert the first force and the second force ($F_1$, $F_2$) on the respective chain link plate connections means (1001B, 1002B) and to actuate the quick release chain fastener (502, 1000) by means of these forces ($F_1$, $F_2$) exerted by the translational movement.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:
1. A portable multifunctional tool comprising
a handle portion having a tool accommodating portion, the tool accommodating portion comprising a bolt on which at least one tool function element is arranged so as to be coupled to the handle portion,
the tool function element being configured to actuate a quick release chain fastener comprising two chain link plates and two chain link plate connection members, in that the tool function element comprises:

a first force exertion unit for exerting a force on the first chain link plate connection member of the quick release chain fastener, and a second force exertion unit for exerting a force on the second chain link plate connection member of the quick release chain fastener, wherein at least one of the two force exertion units comprises an accommodating portion for accommodating the quick release chain fastener, said accommodating portion comprising an engagement portion for engaging between two chain link plates of a chain link adjacent to the quick release chain fastener when the quick release chain fastener is arranged within a chain, in order to avoid tilting of the quick release chain fastener along the longitudinal chain axis, the first force exertion unit and the second force exertion unit being translationally moveable in relation to each other so as to actuate the quick release chain fastener by means of this translational movement, and the tool function element comprising a linear guide comprising a stationary first linear guide element and a second linear guide element movably arranged within the stationary first linear guide element, at least one of the two force exertion units being arranged on the second linear guide element.

2. The portable multifunctional tool as claimed in claim 1, wherein the at least one of the two force exertion units is arranged on the second linear guide element in a manner so that the second linear guide element and the at least one force exertion unit being arranged thereon together move in a same direction.

3. The portable multifunctional tool as claimed in claim 1, wherein the second linear guide element and the at least one force exertion unit being arranged thereon together move toward the respectively other force exertion unit.

4. The portable multifunctional tool as claimed in claim 1, wherein the second linear guide element is movable in a first direction so as to open the quick release chain fastener, and the at least one force exertion unit being arranged on the second linear guide element is arranged in front of the stationary first linear guide element when viewed in this said first direction of movement.

5. The portable multifunctional tool as claimed in claim 1, wherein the tool function element comprises a stationary bearing portion which has the respectively other one of the two force exertions units mounted thereon, the stationary bearing portion being spaced apart from the stationary first linear guide element and being arranged opposite thereof along the direction of movement of the second linear guide element.

6. The portable multifunctional tool as claimed in claim 5, wherein the second linear guide element comprises a threaded portion extending through the stationary first linear guide element but not through the stationary bearing portion.

7. The portable multifunctional tool as claimed in claim 5, wherein the stationary first linear guide element and the stationary bearing portion are configured in one piece.

8. The portable multifunctional tool as claimed in claim 1, wherein a guide portion comprising a first running surface is arranged between the stationary first linear guide element and the stationary bearing portion, and wherein the at least one force exertion unit being arranged on the second linear guide element comprises a second running surface complementary to the first running surface, the two running surfaces supporting the at least one force exertion unit, upon a linear movement, against rotation about the longitudinal axis extending in the direction of movement.

9. The portable multifunctional tool as claimed in claim 1, wherein the accommodating portion and/or the engagement portion comprises a thickness of between 1 mm and 2 mm which is to be measured in a direction orthogonal to the linear movement direction.

10. The portable multifunctional tool as claimed in claim 1, wherein the accommodating portion comprises a contact portion which can be brought into contact with a chain link plate connection member of a quick release chain fastener, said contact portion comprising a radius essentially corresponding to the radius of the chain link plate connection member.

11. The portable multifunctional tool as claimed in claim 10, wherein the radius is between 3.5 mm and 4.0 mm, advantageously between 3.7 mm and 3.9 mm, and more advantageously 3.8 mm.

12. The portable multifunctional tool as claimed in claim 1, wherein the bolt extends transversely to a main extension direction of the handle portion.

13. The portable multifunctional tool as claimed in claim 1, wherein the at least one tool function element comprises a mounting portion by means of which the at least one tool function element is arranged on the bolt, said mounting portion comprising an opening through which the bolt can be passed.

14. The portable multifunctional tool as claimed in claim 1, wherein the at least one tool function element is rotatably arranged on the tool accommodating portion.

15. The portable multifunctional tool as claimed in claim 13, wherein the tool accommodating portion is bipartite and the mounting portion of the at least one tool function element is arranged between the two parts of the tool accommodating portion.

16. The portable multifunctional tool as claimed in claim 1, wherein the handle portion is bipartite, the first part of the handle portion being configured in one piece with a first part of the tool accommodating portion, and the second part of the handle portion being configured in one piece with a second part of the tool accommodating portion.

17. The portable multifunctional tool as claimed in claim 1, the multifunctional tool comprising a second tool accommodating portion arranged opposite the first tool accommodating portion.

18. The portable multifunctional tool as claimed in claim 17, wherein the first and second tool accommodating portions comprise a common sectional axis extending in parallel with a main extension direction of the handle portion.

19. The portable multifunctional tool as claimed in claim 17, wherein the first and second tool accommodating portions comprise a common sectional axis extending transversely to a main extension direction of the handle portion and through the center of the handle portion.

20. A tool function element for a portable multifunctional tool as claimed in claim 1.

21. A portable multifunctional tool comprising:
a handle portion having a tool accommodating portion, the tool accommodating portion comprising a bolt on which at least one tool function element is arranged so as to be coupled to the handle portion,
the tool function element being configured to actuate a quick release chain fastener comprising two chain link plates and two chain link plate connection members, in that the tool function element comprises:
a first force exertion unit for exerting a force on the first chain link plate connection member of the quick release chain fastener, and a second force exertion unit for exerting a force on the second chain link plate connection member of the quick release chain fastener, the first force exertion unit and the second force exertion unit being translationally moveable in relation to each other so as to actuate the quick release chain fastener by means of this translational movement, and the tool function element comprising a linear guide comprising a stationary first linear guide element and a second linear guide element movably arranged within the stationary first linear guide element, at least one of the two force exertion units being arranged on the second linear guide element, wherein the at least one tool function element is rotatably arranged on the tool accommodating portion.

22. A portable multifunctional tool comprising a handle portion having a tool accommodating portion, the tool accommodating portion comprising a bolt on which at least one tool function element is arranged so as to be coupled to the handle portion, the tool function element being configured to actuate a quick release chain fastener comprising two chain link plates and two chain link plate connection members, in that the tool function element comprises:

a first force exertion unit for exerting a force on the first chain link plate connection member of the quick release chain fastener, and a second force exertion unit for exerting a force on the second chain link plate connection member of the quick release chain fastener, the first force exertion unit and the second force exertion unit being translationally moveable in relation to each other so as to actuate the quick release chain fastener by means of this translational movement, and the tool function element comprising a linear guide comprising a stationary first linear guide element and a second linear guide element movably arranged within the stationary first linear guide element, at least one of the two force exertion units being arranged on the second linear guide element, wherein the at least one tool function element comprises a mounting portion by means of which the at least one tool function element is arranged on the bolt, said mounting portion comprising an opening through which the bolt can be passed, and wherein the tool accommodating portion is bipartite and the mounting portion of the at least one tool function element is arranged between the two parts of the tool accommodating portion.

23. A portable multifunctional tool comprising a handle portion having a tool accommodating portion, the tool accommodating portion comprising a bolt on which at least one tool function element is arranged so as to be coupled to the handle portion, the tool function element being configured to actuate a quick release chain fastener comprising two chain link plates and two chain link plate connection members, in that the tool function element comprises:

a first force exertion unit for exerting a force on the first chain link plate connection member of the quick release chain fastener, and a second force exertion unit for exerting a force on the second chain link plate connection member of the quick release chain fastener, the first force exertion unit and the second force exertion unit being translationally moveable in relation to each other so as to actuate the quick release chain fastener by means of this translational movement, and the tool function element comprising a linear guide comprising a stationary first linear guide element and a second linear guide element movably arranged within the stationary first linear guide element, at least one of the two force exertion units being arranged on the second linear guide element, wherein the handle portion is bipartite, the first part of the handle portion being configured in one piece with a first part of the tool accommodating portion, and the second part of the handle portion being configured in one piece with a second part of the tool accommodating portion.

24. A portable multifunctional tool comprising a handle portion having a tool accommodating portion, the tool accommodating portion comprising a bolt on which at least one tool function element is arranged so as to be coupled to the handle portion, the tool function element being configured to actuate a quick release chain fastener comprising two chain link plates and two chain link plate connection members, in that the tool function element comprises:

a first force exertion unit for exerting a force on the first chain link plate connection member of the quick release chain fastener, and a second force exertion unit for exerting a force on the second chain link plate connection member of the quick release chain fastener, the first force exertion unit and the second force exertion unit being translationally moveable in relation to each other so as to actuate the quick release chain fastener by means of this translational movement, and the tool function element comprising a linear guide comprising a stationary first linear guide element and a second linear guide element movably arranged within the stationary first linear guide element, at least one of the two force exertion units being arranged on the second linear guide element, the multifunctional tool comprising a second tool accommodating portion arranged opposite the first tool accommodating portion.

* * * * *